United States Patent
Egawa et al.

(10) Patent No.: US 7,911,507 B2
(45) Date of Patent: Mar. 22, 2011

(54) SOLID-STATE IMAGE PICKUP DEVICE IN WHICH THE SATURATED SIGNAL QUANTITY OF A W PIXEL IS CONTROLLED

(75) Inventors: Yoshitaka Egawa, Yokohama (JP); Hiroto Honda, Yokohama (JP); Yoshinori Iida, Tokyo (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 624 days.

(21) Appl. No.: 11/967,585

(22) Filed: Dec. 31, 2007

(65) Prior Publication Data

US 2008/0211943 A1    Sep. 4, 2008

(30) Foreign Application Priority Data

Jan. 5, 2007    (JP) .................. 2007-000718

(51) Int. Cl.
*H04N 5/235* (2006.01)
*H04N 9/68* (2006.01)
*H04N 3/14* (2006.01)
*H04N 9/083* (2006.01)
*H04N 5/335* (2006.01)
*H04N 9/04* (2006.01)

(52) U.S. Cl. ..................... 348/230.1; 348/238; 348/276; 348/279

(58) Field of Classification Search ............... 348/229.1, 348/230.1, 238, 273, 276, 277, 279, 280
See application file for complete search history.

(56) References Cited

U.S. PATENT DOCUMENTS

| | | | |
|---|---|---|---|
| 6,714,243 B1 * | 3/2004 | Mathur et al. | 348/273 |
| 2005/0248667 A1 * | 11/2005 | Schweng et al. | 348/273 |
| 2007/0076269 A1 * | 4/2007 | Kido et al. | 358/474 |
| 2007/0097240 A1 | 5/2007 | Egawa et al. | |

(Continued)

FOREIGN PATENT DOCUMENTS

CN    1156915 C    7/2004

(Continued)

OTHER PUBLICATIONS

U.S. Appl. No. 12/179,976, filed Aug. 25, 2008, Yasuo, et al.

(Continued)

*Primary Examiner* — John M Villecco
(74) *Attorney, Agent, or Firm* — Oblon, Spivak, McClelland, Maier & Neustadt, L.L.P.

(57) ABSTRACT

In a pixel unit, cells are arranged in rows and columns two-dimensionally. Each of the cells accumulates signal charge obtained by photoelectrically converting light incident on photoelectric conversion section and outputs a voltage corresponding to the accumulated signal charge. On the cells, W, R, G, and B color filters are provided. Analog signals output from the W pixel, R pixel, G pixel, and B pixel are converted into digital signals by an analog/digital converter circuit, which outputs a W signal, an R signal, a G signal, and a B signal separately. A W signal saturated signal quantity is controlled by a saturated signal quantity control circuit. Then, a signal generator circuit corrects the R signal, the G signal, and the B signal using the W signal, the R signal, the G signal, and B signal output from the analog/digital converter circuit and outputs the corrected R, G, and B signals.

20 Claims, 17 Drawing Sheets

U.S. PATENT DOCUMENTS

| | | | |
|---|---|---|---|
| 2007/0257998 A1* | 11/2007 | Inoue | 348/272 |
| 2009/0040353 A1* | 2/2009 | Yamamoto | 348/308 |
| 2009/0167893 A1* | 7/2009 | Susanu et al. | 348/224.1 |
| 2009/0213256 A1* | 8/2009 | Kudoh | 348/302 |
| 2010/0141812 A1* | 6/2010 | Hirota | 348/279 |

FOREIGN PATENT DOCUMENTS

| | | |
|---|---|---|
| CN | 1171462 C | 10/2004 |
| JP | 8-23542 | 1/1996 |
| JP | 2001-111900 | 4/2001 |
| JP | 2003-318375 | 11/2003 |
| JP | 2004-304706 | 10/2004 |
| JP | 2005-295381 | 10/2005 |
| WO | WO 99/59345 | 11/1999 |
| WO | WO 2006/064564 A1 | 6/2006 |
| WO | WO 2006/137419 A1 | 12/2006 |

OTHER PUBLICATIONS

U.S. Appl. No. 12/123,816, filed May 20, 2008, Egawa.
U.S. Appl. No. 12/134,680, filed Jun. 6, 2008, Egawa.
U.S. Appl. No. 11/390,456, filed Mar. 28, 2006, Yoshitaka Egawa, et al.
U.S. Appl. No. 11/690,364, filed Mar. 23, 2007, Yoshinori Iida, et al.
U.S. Appl. No. 11/815,903, filed Aug. 9, 2007, Hiroto Honda, et al.

* cited by examiner

Subtraction method (conventional method)

Ratio multiplying method (new method)

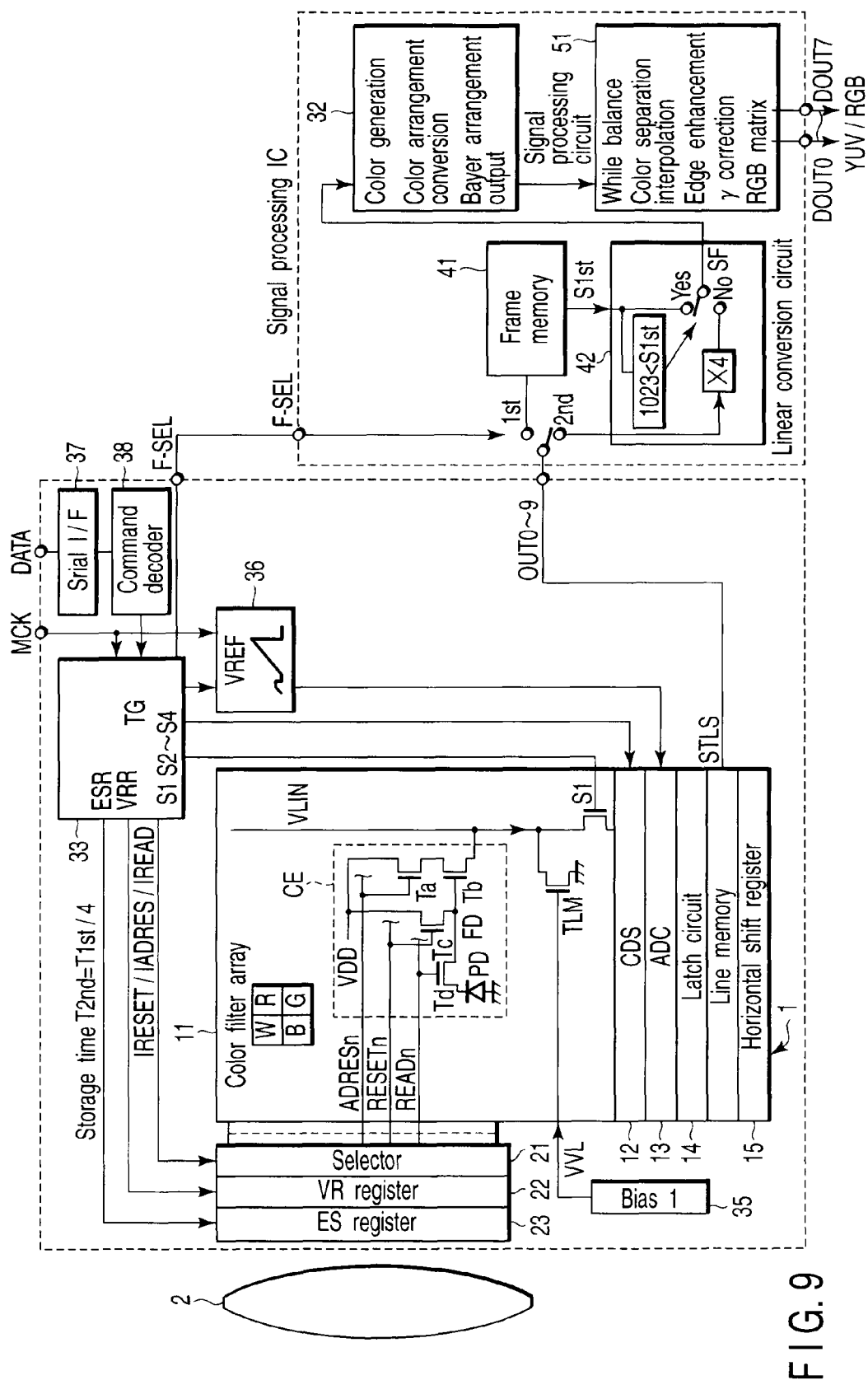
F I G. 9

$Wrgb22=(G11+G12)/2+R11+B21$
$Gw22=W22*((G11+G12)/2)/Wrgb22)$
$Rw22=W22*(R11/Wrgb22)$
$Bw22=W22*(B21/Wrgb22)$ (a) Signal SF

| B11 | W11 | R11 | W12 | B12 |
|-----|-----|-----|-----|-----|
| W21 | G11 | W22 | G12 | W21 |
| R21 | W31 | B21 | W32 | R22 |
| W41 | G21 | W42 | G22 | W41 |

(b) Color generator circuit

| B11 | Gw11<br>Rw11<br>Bw11 | R11 | Gw12<br>Rw12<br>Bw12 | B12 |
|-----|-----|-----|-----|-----|
| Gw21<br>Rw21<br>Bw21 | G11 | Gw22<br>Rw22<br>Bw22 | G12 | Gw21<br>Rw21<br>Bw21 |
| R21 | Gw31<br>Rw31<br>Bw31 | B21 | Gw32<br>Rw32<br>Bw32 | R22 |
| Gw41<br>Rw41<br>Bw41 | G21 | Gw42<br>Rw42<br>Bw42 | G22 | Gw43<br>Rw43<br>Bw43 |

FIG. 11

$$Wrgb32 = (G12+G13+G21+G22+G23+G24+G32+G33)/8$$
$$+(R11+R21/2+R22/2)/2+(B21+B11/2+B12/2)/2$$

$$Gw32 = W32 * ((G12+G13+G21+G22+G23+G24+G32+G33)/8)/Wrgb32)$$
$$Rw32 = W32 * ((R11+R21/2+R22/2)/2)/Wrgb32)$$
$$Bw32 = W32 * ((B21+B11/2+B12/2)/2)/Wrgb32)$$

FIG. 12

(a) Siognal SF

| G11 | W11 | G12 | W12 | G13 | W13 | G14 |
|-----|-----|-----|-----|-----|-----|-----|
| W21 | B11 | W22 | R11 | W23 | B12 | W24 |
| G21 | W31 | G22 | W32 | G23 | W33 | G24 |
| W41 | R21 | W42 | B21 | W43 | R22 | W44 |
| G31 | W51 | G32 | W52 | G33 | W53 | G34 |

(b) Color generator circuit

| B11 | Gw22 Rw22 Bw22 | R11 | Gw23 Rw23 Bw23 | B12 |
|-----|-----|-----|-----|-----|
| Gw31 Rw31 Bw31 | G22 | Gw32 Rw32 Bw32 | G23 | Gw33 Rw33 Bw33 |
| R21 | Gw42 Rw42 Bw42 | B21 | Gw43 Rw43 Bw43 | R22 |
| Gw51 Rw51 Bw51 | G32 | Gw52 Rw52 Bw52 | G33 | Gw53 Rw53 Bw53 |

Signal SF

| G11 | W11 | W12 | W13 | G12 | W14 | W15 | W16 |
|-----|-----|-----|-----|-----|-----|-----|-----|
| W21 | R11 | W22 | B11 | W23 | R12 | W24 | B12 |
| W31 | W32 | G21 | W33 | W34 | W35 | G22 | W36 |
| W41 | B21 | W42 | R21 | W43 | B22 | W44 | R22 |
| G31 | W51 | W52 | W53 | G32 | W54 | W55 | W56 |
| W61 | R31 | W62 | B31 | W63 | R32 | W64 | B32 |

F I G. 17

Signal SF

| W11 | G11 | W12 | B11 | W13 | G12 | W14 | B12 |
|-----|-----|-----|-----|-----|-----|-----|-----|
| W21 | W22 | W23 | W24 | W25 | W26 | W27 | W28 |
| W31 | R21 | W32 | G21 | W33 | R22 | W34 | G22 |
| W41 | W42 | W43 | W44 | W45 | W46 | W47 | W48 |
| W51 | G31 | W52 | B31 | W53 | G32 | W54 | B32 |
| W61 | W62 | W63 | W64 | W65 | W66 | W67 | W68 |

F I G. 18

SOLID-STATE IMAGE PICKUP DEVICE IN WHICH THE SATURATED SIGNAL QUANTITY OF A W PIXEL IS CONTROLLED

CROSS-REFERENCE TO RELATED APPLICATIONS

This application is based upon and claims the benefit of priority from prior Japanese Patent Application No. 2007-000718, filed Jan. 5, 2007, the entire contents of which are incorporated herein by reference.

BACKGROUND OF THE INVENTION

1. Field of the Invention

This invention relates to a solid-state image pickup device, and more particularly to a CMOS image sensor used for a mobile-phone with an image sensor, a digital camera, or a video camera.

2. Description of the Related Art

A wide variety of arrangements of color filters used in image sensors, ranging from complementary color filters to primary-color Bayer arrangements, have been proposed together with a method of processing the signals. With the further microfabrication of pixels in recent years, image sensors with pixels of the order of 2 μm have been put to practical use and the development of 1.75-μm pixels and 1.4-μm pixels is now in progress. In microscopic pixels of the order of 2 μm or less, since the quantity of incident light decreases significantly, deterioration by noise is liable to take place. In this connection, as a method of improving the sensitivity of microscopic pixels, an image sensor using a white (W) color filter has been proposed (e.g., refer to Jpn. Pat. Appln. KOKAI Publication No. 8-23542, Jpn. Pat. Appln. KOKAI Publication No. 2003-318375, Jpn. Pat. Appln. KOKAI Publication No. 2004-304706, or Jpn. Pat. Appln. KOKAI Publication No. 2005-295381).

However, since white (W) pixels are highly sensitive, the white (W) signals obtained from the W pixels get saturated easily. In addition to this problem, since Y signal (luminance signal)=W signal, there is a problem with color reproducibility. Normally, the color reproducibility of the RGB signals produced from the YUV signals becomes worse unless the Y signal is generated at this ratio: Y=0.59G+0.3R+0.11B. Furthermore, in the above patent documents, an effective signal process using W pixels has not been carried out.

BRIEF SUMMARY OF THE INVENTION

According to an aspect of the invention, there is provided a solid-state image pickup device comprising: a pixel unit in which cells are arranged in rows and columns two-dimensionally on a semiconductor substrate, each of the cells having photoelectric conversion section, accumulating signal charge obtained by photoelectrically converting light incident on the photoelectric conversion section, and outputting a voltage corresponding to the accumulated signal charge; W (white), R (red), G (green), and B (blue) color filters provided on the cells in the pixel unit; an analog/digital converter circuit which converts analog signals output from a W pixel, an R pixel, a G pixel, and a B pixel on whose cells the W (white), R (red), G (green), and B (blue) color filters are provided respectively into digital signals, and outputs a W signal, an R signal, a G signal, and a B signal separately; a saturated signal quantity control circuit which controls the saturated signal quantity of the W pixel; and a signal generator circuit which corrects and generates the R signal, the G signal, and the B signal using the W signal, the R signal, the G signal, and B signal output from the analog/digital converter circuit.

BRIEF DESCRIPTION OF THE SEVERAL VIEWS OF THE DRAWING

FIG. 9 is a block diagram schematically showing the configuration of a CMOS image sensor according to a fourth embodiment of the invention;

FIG. 11 shows a color filter array and an example of the processing at the signal generator circuit in a CMOS image sensor according to a sixth embodiment of the invention;

FIG. 12 shows a color filter array and an example of the processing at the signal generator circuit in a CMOS image sensor according to a seventh embodiment of the invention;

FIG. 17 shows a color filter array in a CMOS image sensor according to a thirteenth embodiment of the invention; and FIG. 18 shows another color filter array in a CMOS image sensor according to the thirteenth embodiment.

DETAILED DESCRIPTION OF THE INVENTION

Figure 1:
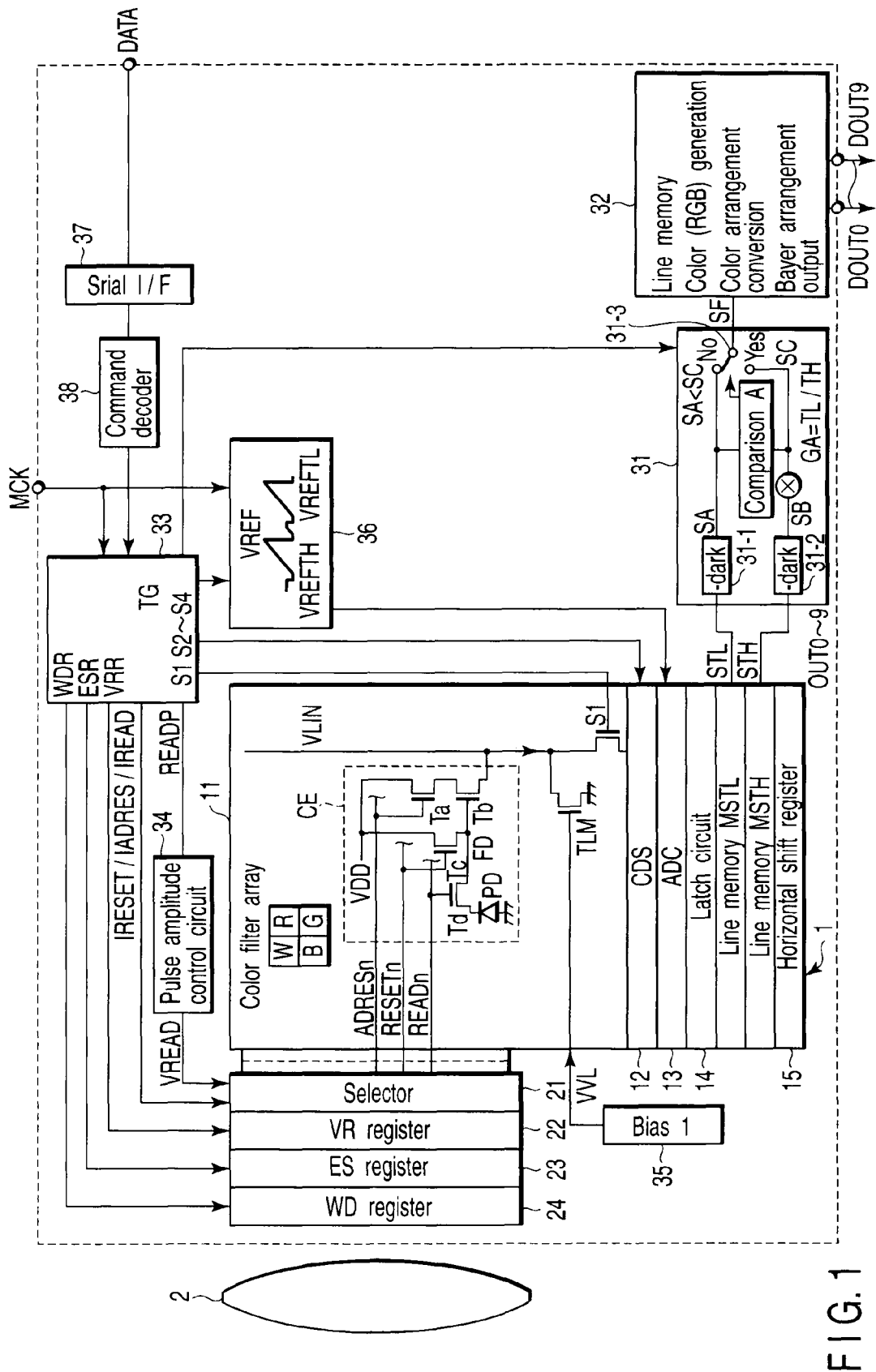
FIG. 1 is a block diagram schematically showing the configuration of a CMOS image sensor according to a first embodiment of the invention.

Hereinafter, referring to the accompanying drawings, an amplification CMOS image sensor functioning as a solid-state image pickup device according to an embodiment of the invention will be explained. In explanation, the same parts are indicated by the same reference numerals throughout the drawings.

First Embodiment

First, a CMOS image sensor according to a first embodiment of the invention will be explained.

FIG. 1 is a block diagram schematically showing the configuration of a CMOS image sensor according to the first embodiment.

A sensor core unit 1 includes a pixel unit 11, a column noise cancel circuit (CDS) 12, a column analog digital converter (ADC) 13, a latch circuit 14, two line memories (a first line memory MSTH and a second line memory MSTL), and a horizontal shift register 15.

Light is caused to pass through a lens 2 and enter the pixel unit 11, which then generates charge corresponding to the quantity of incident light by photoelectric conversion. In the pixel unit 11, cells (pixels) CE are arranged in rows and columns two-dimensionally. Each of the cells is composed of four transistors Ta, Tb, Tc, Td and photoelectric conversion section, such as a photodiode PD. Pulse signals ADRESn, RESETn, READn are supplied to each cell. Source follower circuit load transistors TLM are arranged horizontally in the lower part of the pixel unit 11. One end of the current path of each of the load transistors TLM is connected to a vertical signal line VLIN. The other end of the current path is connected to the ground point. A color filter formed in the upper part of a photodiode PD is a 4-color filter obtained by substituting W (white) for one of Gs in the Bayer arrangement using 3 colors, G (green), R (red), G (green), and B (blue) in conventional 2×2 pixels. W is realized by enabling light to pass through in the entire wavelength region without using a color filter.

An analog signal corresponding to the signal charge generated at the pixel unit 1 is supplied via the CDS 12 to the ADC 13. The ADC 13 converts the analog signal into a digital signal, which is latched in the latch circuit 14. The digital signal latched in the latch circuit 14 is accumulated in the line memories MSTH, MSTL. The accumulated signal is selected and read by the horizontal shift register 15 sequentially. Then, the signal is read from the sensor core unit 1 sequentially. Specifically, the line memories MSTH, MSTL store two signals STL (long-time storage) and STH (short-time storage) differing in storage time. The digital signals OUT0 to OUT9 read from the line memories MSTH, MSTL are supplied to a linear conversion circuit 31 which performs conversion so as to make a signal linear with respect to the quantity of light. The linear conversion circuit 31 combines the two signals STL and STH into a signal SF. The combined signal SF is supplied to a signal generator circuit 32 in a subsequent stage. The signal generator circuit 32 generates RGB signals from the W signal and further converts the signals into an RGB Bayer arrangement and outputs RGB 10-bit digital outputs DOUT0 to DOUT9 to a signal process IC in a subsequent stage (not shown).

Next to the pixel unit 11, there are provided a pulse selector circuit (selector) 21, a signal read vertical register (VR register) 22, a storage time control vertical register (ES register, long storage time control register) 23, and a storage time control vertical register (WD register, short storage time control register) 24.

The reading of the pixel unit 11 and the control of the column noise cancel circuit (CDS) 12 are performed by pulse signals S1 to S4, READP, IRESET/IADRES/IREAD, VRR, ESR, WDR output from a timing generator (TG) 33. That is, the timing generator (TG) 33 functions as a control circuit.

The pulse signals S2 S4 are supplied to the CDS 12. The pulse signal READP is supplied to a pulse amplitude control circuit 34. The output signal VREAD from the pulse amplitude control circuit 34 is supplied to the pulse selector circuit 21. Also supplied to the pulse selector circuit 21 are the pulse signals IRESET/IADRES/IREAD. The pulse signal VRR is supplied to the VR register 22, the pulse signal ESR is supplied to the ES register 23, and the pulse signal WDR is supplied to the WD register 24. The registers 22, 23, 24 select a vertical line of the pixel unit 11 and supply the pulse signals RESET/ADRES/READ (represented by RESETn, ADRESn, READn in FIG. 1) to the pixel unit 11 via the pulse selector circuit 21. The address pulse signal ADRESn is supplied to the gate of the row select transistor Ta in the cell, the reset pulse signal RESETn is supplied to the gate of the reset transistor Tc in the cell, and the read pulse signal READn is supplied to the gate of the read transistor Td in the cell. To the pixel unit 11, a bias voltage VVL is applied from a bias generator circuit (bias 1) 35. The bias voltage VVL is supplied to the gate of the source follower circuit load transistor TLM.

A reference voltage generator circuit (VREF) 36 is a circuit which operates in response to a main clock signal MCK and generates reference waveforms VREFTL, VREFTH for AD conversion at the ADC 13. The amplitude of the reference waveforms is controlled by data DATA input to a serial interface (serial I/F) 37. A command input to the serial interface 37 is supplied to a command decoder 38, which decodes the command and supplies the decoded signal together with the main clock signal MCK to the timing generator 33. To perform AD conversion twice in one horizontal scanning period, the reference voltage generator circuit 36 generates triangular waveforms VREFTL and VREFTH and supplies these to the ADC 13. The pulse signal READP output from the timing generator 33 is supplied to the pulse amplitude control circuit 34. The pulse amplitude control circuit 34 controls the amplitude to generate a 3-valued pulse signal VREAD and supplies the signal VREAD to the pulse selector circuit 21.

The linear conversion circuit 31 is a circuit which converts and combines two signals STL (long-time storage) and STH (short-time storage) differing in storage time so that the resulting signal may be linear with respect to the quantity of light. The linear conversion circuit 31 includes two subtraction circuits (-dark) 31-1, 31-2 which subtract a black-level dark signal, a gain circuit GA which amplifies the output of the subtraction circuit 31-2, a comparison circuit A, and a switch 31-3. To the linear conversion circuit 31, a short exposure time (charge storage time) signal STH stored in the line memory MSTH and a long exposure time signal STL stored in the line memory MSTL are input simultaneously.

In an analog/digital converting operation at the ADC 13, since a dark level is set to a 64 LSB level, the dark level 64 is subtracted from the output signals STL, STH of the line memories MSTL, MSTH at the subtraction circuits 31-1, 31-2. The signal SB subjected to the subtraction process is amplified by the gain circuit GA, thereby generating a signal SC. If the exposure time of the signal STL and that of the signal STH are TL and TH respectively, the gain quantity can be calculated from the ratio of TL/TH. By multiplying the signal SB by the gain, the inclinations can be made equivalently the same even if the photoelectric conversion characteristic curves differ in inclination. The comparison circuit A compares the signal SC with the signal SA obtained by subtracting the dark level from the STL signal. The larger signal is selected at the switch circuit 31-3. As a result, the signal SA is combined smoothly with the signal SC obtained by multiplying the signal SB by the gain. The output signal SF of the linear conversion circuit 31 is increased in the number of bits and is output in 12 bits.

Figure 2:
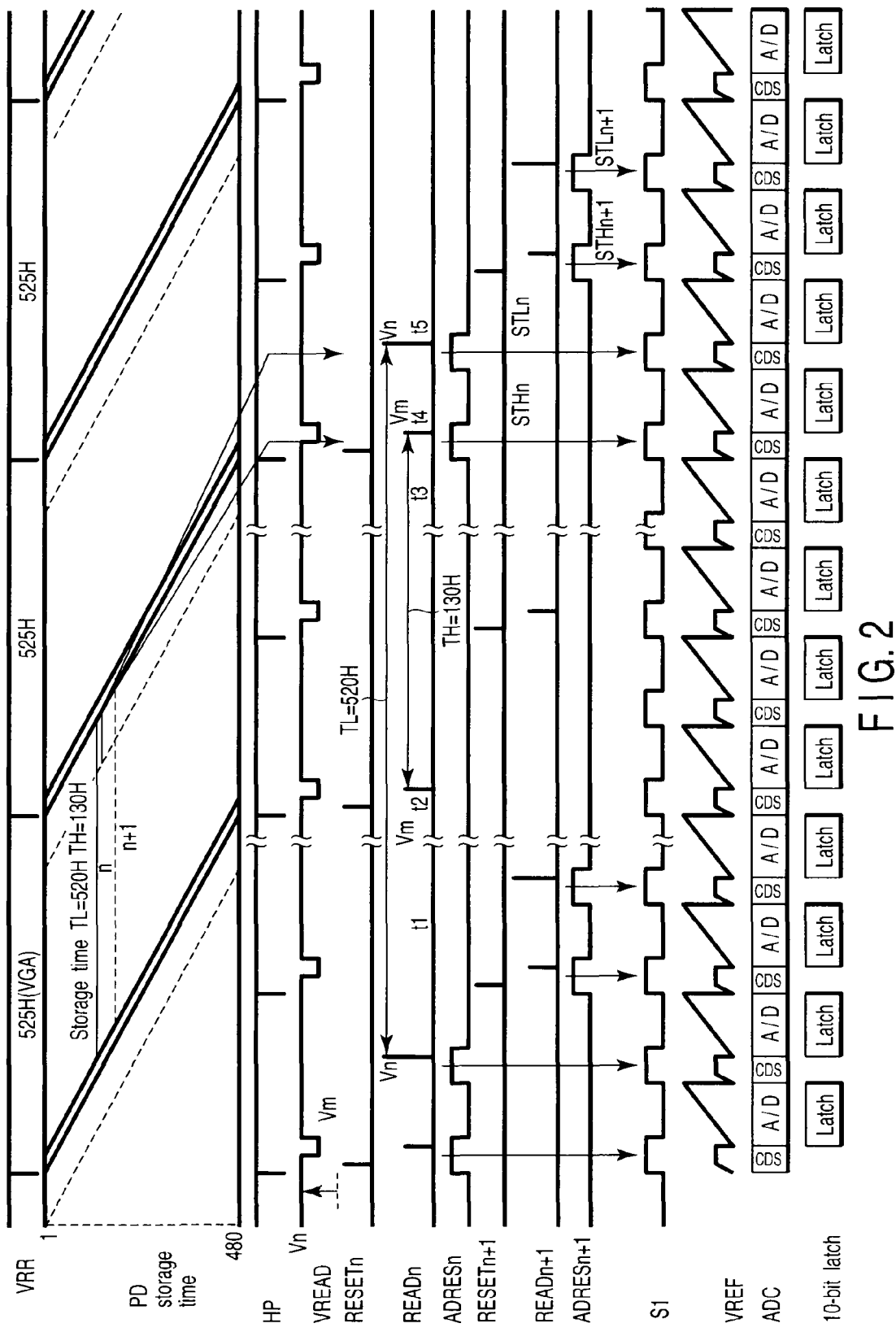
FIG. 2 is a waveform diagram showing the operation timing of the CMOS image sensor shown in FIG. 1.

FIG. 2 is a waveform diagram showing the operation timing of the CMOS image sensor shown in FIG. 1. In the first embodiment, suppose the storage time during which n vertical lines of photodiodes PD perform photoelectric conversion and accumulate charge is TL=520 H. Moreover, let the short storage time TH be TH=130 H, which is ¼ the quantity of light of the long storage time TL. In the long storage time TL, the amplitude of the read pulse signal READ is controlled at a high level (Vn=2.8 V). In the short storage time TH, the amplitude of the read pulse signal READ is controlled at a low level (Vm=1 V). To generate read pulse signals READ differing in amplitude level, the amplitude of the read pulse READ is controlled by the output signal VREAD of the pulse amplitude control circuit 34. The storage time TL can be controlled by the ES register 23 in units of 1 H. The storage time TH can be controlled by the WD register 24 in units of 1 H. Moreover, control can be performed in units of less than 1 H by changing the input pulse position of the pulse selector circuit 21.

At the time (t4) of a first operation of reading the signal charge stored in the photodiode PD, the pulse signals RESETn, READn, ADRESn are supplied to the pixel unit 11 in synchronization with a horizontal synchronizing pulse HP, thereby reading the signal charge converted photoelectrically and accumulated by the photodiode PD. The amplitude of the read pulse READ at this time is set to the low level Vm. The signal charge read in the first read operation is discharged in such a manner that the read pulse READ of the low level Vm is input at time t2 in the middle of the storage time 520 H and a part of the signal charge in the photodiode PD is read out. Moreover, the signal accumulated again in the period between time t2 and time t4 is read from the photodiode PD at time t4.

When the reset level of a sensing unit at the time of making the pulse signal RESETn on and off is taken in, the amplitude of the reference waveform is set to an intermediate level and reading is done. The intermediate level is adjusted automatically in the image sensor so that a light shielding pixel (OB) section of the pixel unit 11 may be at a 64 LSB level. Next, the signal READn is made on, thereby outputting the signal. For the read-out signal, a triangular waveform is generated as a reference waveform in a 0.5-H period, the first half of the horizontal scanning period, thereby performing 10-bit AD conversion. The AD-converted signal (digital data) is held in the latch circuit 14. After the AD conversion has been completed, the AD-converted signal is stored in the line memory MSTH.

At the time (t5) of a second operation of reading from the photodiode PD, the pulse signals RESETn, READn, ADRESn are supplied to the pixel unit 11 after 0.5 H has elapsed since the first read operation, thereby reading the signal charge converted photoelectrically and accumulated by the photodiode PD. The amplitude of the read pulse READ at this time is set to the high level Vn.

The signal charge left in the photodiode PD is read by inputting the pulse signals READn and ADRESn without applying the pulse signal RESETn. The signal at time t4 is used as the reset level of the sensing section. The read-out signal is added to the STH signal stored in the sensing section after the pulse signal READn is made on and the resulting signal is output. For the read-out signal, a triangular waveform is generated as a reference waveform in a 0.5-H period, the last half of the horizontal scanning period, thereby performing 10-bit AD conversion. The AD-converted signal is held in the latch circuit 14. After the AD conversion has been completed, the AD-converted signal is stored in the line memory MSTL. In this way, the signals (digital data) stored in the line memories MSTH, MSTL are supplied as data OUT0 to OUT9 simultaneously to the linear conversion circuit 31 in the next one horizontal scanning period, thereby processing the signal in pixels.

Figure 3A:
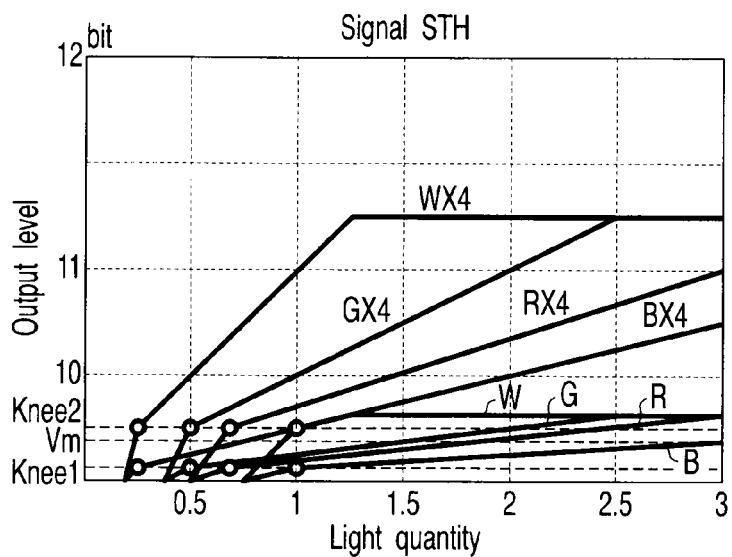
FIGS. 3A, 3B, and 3C are photoelectric conversion characteristic diagrams showing the operation of a linear conversion circuit 31 shown in FIG. 1.
Figure 3B:
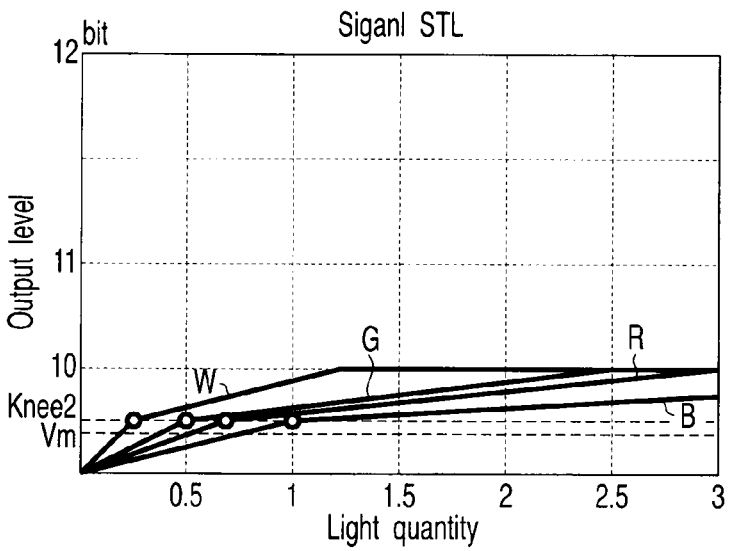
Figure 3C:
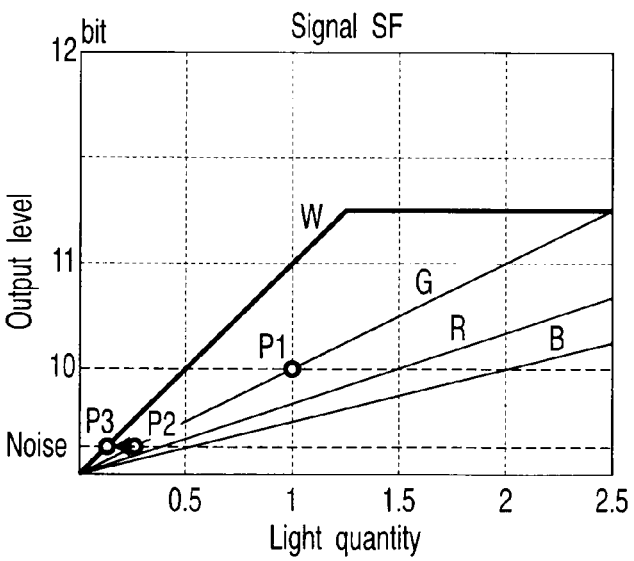

FIGS. 3A, 3B, and 3C are photoelectric conversion characteristic diagrams showing the operation of the linear conversion circuit 31 shown in FIG. 1. FIG. 3A shows the signal STH. FIG. 3B shows the signal STL. FIG. 3C shows the signal SF. The abscissa axis indicates the quantity of light. The ordinate axis indicates the digital output level.

In the signal STH of FIG. 3A, the W, R, G, B signals rise at the same inclination as that of the signal STL of FIG. 3B up to an output level of Knee1. From the output level Knee1 on, they are output in such a manner that they are suppressed to ¼ the inclination of the storage time ratio of TH/TL. At this time, a saturation level occurs within a 10-bit output. In the linear conversion circuit 31, the amplifying circuit GA determined by the storage time ratio quadruples the signal STH. When the gain is quadrupled in this way, the output level Knee1 is shifted to a quadrupled output level of Knee2. Then, at the output level Knee2 or more, the inclination is quadrupled, giving W×4, G×4, R×4, and B×4. The inclination is the same as that up to the output level Knee2 of the signal STL shown in FIG. 3B. Since the sensing unit is not reset in the period between time t4 and time t5 as shown in FIG. 2, the signal STH is added to the signal STL at and above Vm on the ordinate axis of FIG. 3B and the resulting signal is output. The saturation level of the signal STL is 10 bits at which the signal is clipped by AD conversion. In the signal SF of FIG. 3C (the linearly-converted last output), the signal STL is output up to the output level Knee2. Beyond the output level Knee2, the signal STL is changed to the signal STH quadrupled in gain, which is then output. As described above, the linear conversion circuit 31 processes the signals STL and STH differing in storage time so as to make their storage times equal spuriously.

Previously, when the quantity of light was set at point P1 where the G signal was saturated, the W signal was saturated at a light quantity of 0.5. In the first embodiment, the W signal is extended at a light quantity of 1 to an AD conversion 11-bit level twice that of the G signal in a wide dynamic range operation (WDR). That is, using the wide dynamic range operation enables the W signal to be set to a light quantity of 1 as in the past. Previously, the light quantity of the G signal was limited to the same level as that of noise at the smallest subject light quantity. When the W signal was used, the sensitivity was doubled with respect to the G signal, with the result that the smallest subject light quantity was improved to be a small light quantity of ½ (from observation results). If the storage time ratio is made smaller than ¼, the saturation level of the W signal can be improved further. This makes it possible to shift point P1 to the light quantity 2 or 4 on the right side. That is, the light quantity reaching 10 bits can be shifted to 2 or 4, which further improves the dynamic range. At this time, the output of the image sensor shown in FIG. 1 is made larger than 10 bits so as to be 12 bits or 14 bits.

Figure 4:
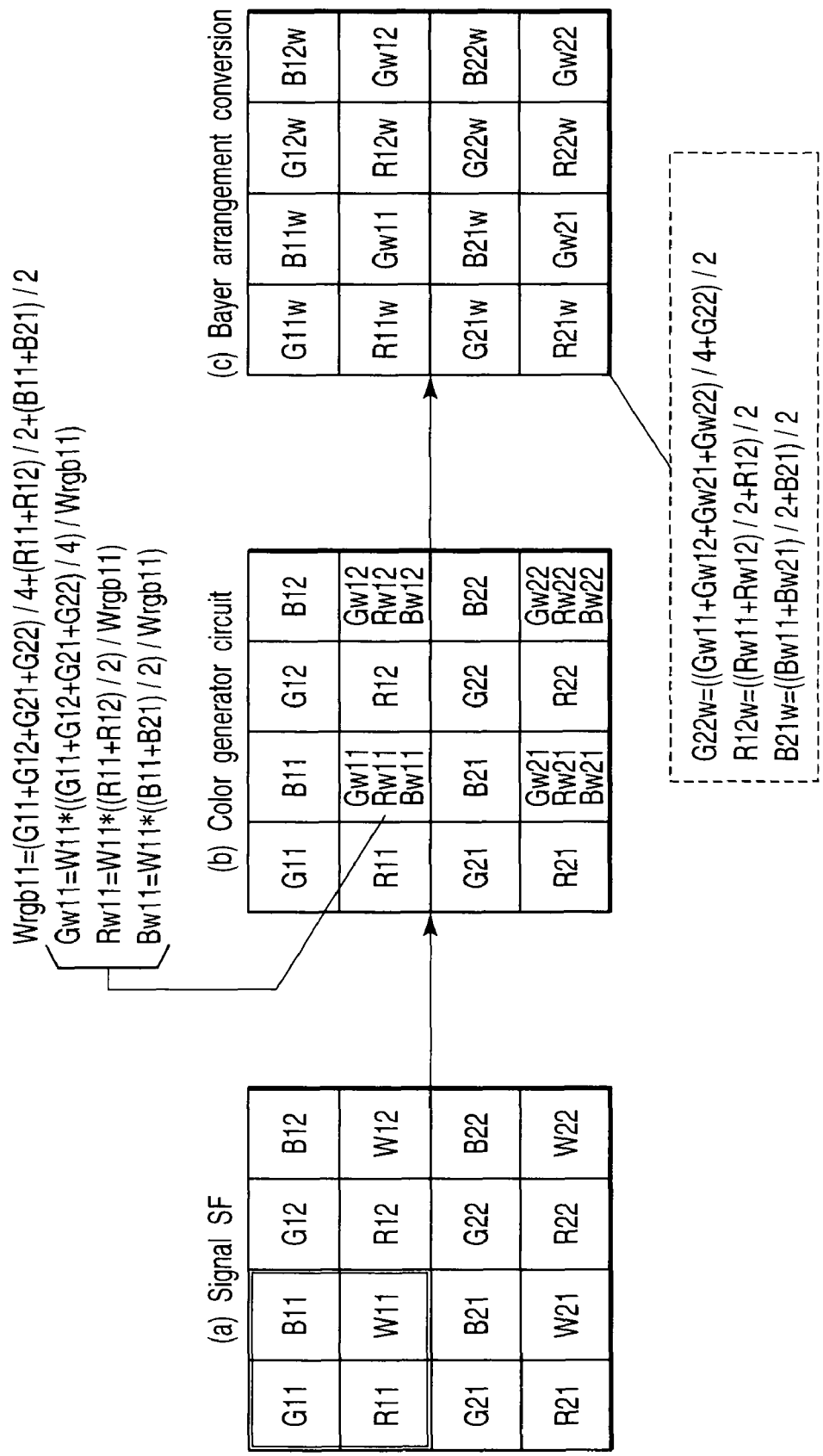
FIG. 4 shows an example of the processing at a signal generator circuit 32 shown in FIG. 1.

FIG. 4 show examples of processing at the signal generator circuit 32 of FIG. 1. The signal generator circuit 32 includes a color generator circuit, a color arrangement conversion circuit, and a line memory. In the signal SF as shown by (a) in FIG. 4 input to the signal generator circuit 32, G in the R line is replaced with the W signal in an ordinary RGB Bayer arrangement. Such a 2×2 pattern is input repeatedly.

Figure 5:
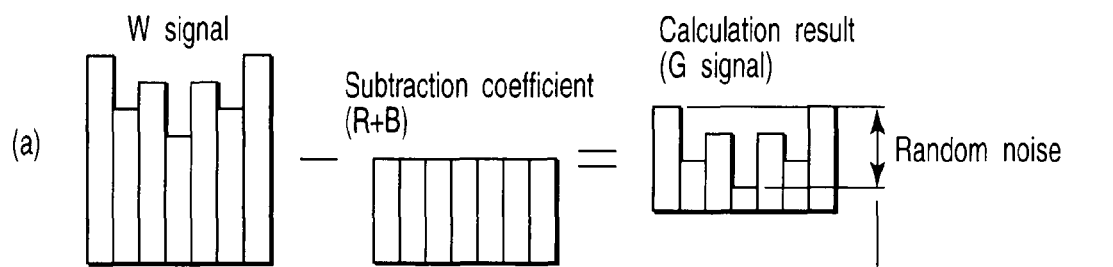
FIG. 5 schematically shows a method of generating RGB signals from a conventional W signal and a method of generating RGB signals from a W signal of the first embodiment.
Figure 5:
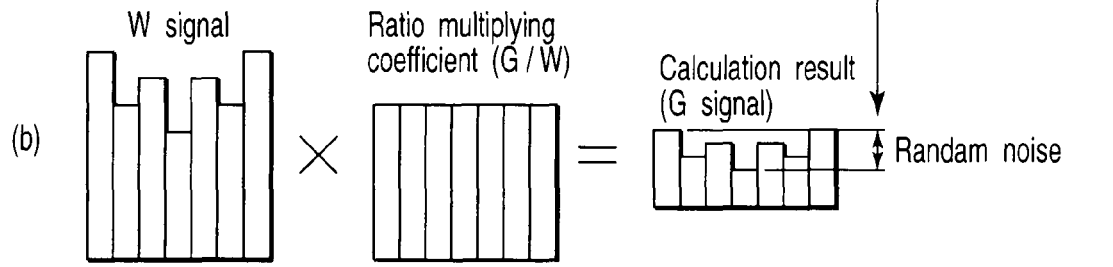

First, the processing at the color generator circuit which generates RGB signals from the W signal will be explained. In FIG. 5, (a) schematically shows a conventional subtraction method of generating RGB signals from the W signal. In FIG.

5, (b) schematically shows a ratio multiplying method of generating RGB signals from the W signal in the first embodiment.

For example, when a G signal was generated from the W signal, a G signal was calculated in a conventional subtraction method by subtracting "subtraction coefficient×(R+B)" from the W signal as shown by (a) in FIG. 5, which resulted in high random noise. In contrast, in the radio multiplying method used in the first embodiment, a G signal is calculated by multiplying the W signal by "the ratio multiplying coefficient G/W" as shown by (b) in FIG. 5, which enables random noise to be suppressed.

Here, concrete calculation examples will be described, focusing attention on pixel W11.

In conventional ordinary processing, the following equations are given:

$$Gw11 = W11 - Kg * \left(\frac{R11 + R12}{2} + \frac{B11 + B21}{2}\right)$$

$$Rw11 = W11 - Kr * \left(\frac{G11 + G12 + G21 + G22}{4} + \frac{B11 + B21}{2}\right)$$

$$Bw11 = W11 - Kb * \left(\frac{G11 + G12 + G21 + G22}{4} + \frac{R11 + R12}{2}\right)$$

where Kg, Kr, and Kb are coefficients for adjusting the amount of signal obtained from the spectroscopic characteristic.

In contrast, in the first embodiment, in FIG. 4, (b) shows a ratio multiplying method of calculating a W (white) signal level and RGB signal levels from 8 surrounding pixels and generating Rw, Gw, and Bw signals from pixel W11 on the basis of the ratio of RGB to W:

$$Wrgb11 = \frac{G11 + G12 + G21 + G22}{4} + \frac{R11 + R21}{2} + \frac{B11 + B21}{2}$$

$$Gw11 = W11 * \left(\frac{(G11 + G12 + G21 + G22)/4}{Wrgb11}\right)$$

$$Rw11 = W11 * \left(\frac{(R11 + R21)/2}{Wrgb11}\right)$$

$$Bw11 = W11 * \left(\frac{(B11 + B21)/2}{Wrgb11}\right)$$

The experimental results have shown that the S/N of the Gw signal generated from W was improved by about 4 dB with respect to the G signal, the S/N of the Rw signal was improved by about 3 dB with respect to the R signal, and the S/N of the Bw signal was improved by about 3 dB with respect to the B signal. In the processing method, since the S/N is improved so greatly that the coefficient K is not necessary, the adjustment of K becomes unnecessary. Moreover, increasing the number of surrounding pixels enables the S/N to be improved further.

In FIG. 4, (c) shows a pixel array subjected to the RGB Bayer arrangement conversion at the color arrangement conversion circuit. Gw11 color-generated is used directly as pixel W11. A method of processing each of GRB will be described using the processing of pixels G22, R12, and B21 as an example. To make the same improvement in the S/N as that of Gw11 and obtain the same resolution level as that of Gw11, pieces of information on the four pixels, Gw11, Gw12, Gw21, Gw22, around pixel G22 are added. Furthermore, the S/N of pixel R12 is improved by adding information on Rw11 and Rw12 generated from W on both sides. Similarly, the S/N of pixel B21 is improved by adding information on Bw11 and Bw21 generated from W above pixel B21 and W below pixel B21.

The following calculations are done sequentially, thereby converting the data into a Bayer arrangement:

$$G22w = \frac{(Gw11 + Gw12 + Gw21 + Gw22)/4 + G22}{2}$$

$$R12w = \frac{(Rw11 + Rw12)/2 + R12}{2}$$

$$B21w = \frac{(Bw11 + Bw21)/2 + B21}{2}$$

Then, the signal generator circuit 32 outputs data DOUT0 to DOUT9 converted into a Bayer arrangement.

In experiments, in the result of processing the luminance signal Y=0.59G+0.3R+0.11B of the YUV signal, the S/N of the luminance signal Y was improved by about 4.5 dB at an ordinary light quantity. Moreover, at the lowest subject illuminance, effective use of the W signal realized twice the sensitivity determined by a conventional G signal.

With the first embodiment configured as described above, since the W signal can be prevented from being saturated even if the W signal obtained from high-sensitivity W pixels is used, the standard setting light quantity input to the pixel unit will never be shifted to the low light quantity side. Moreover, since the RGB signals are obtained from the W signal using the ratio multiplying method, noise in the RGB signals can be improved. In addition, since RGB resolution information can be increased, false color signals can be reduced. Additionally, since the conversion of the output signal into the RGB Bayer arrangement enables a general-purpose signal processing IC to be used, products can be commercialized early. Moreover, in combination with a dynamic range extending mode, the dynamic range can be extended, which makes it possible to realize an image sensor capable of covering a low to a high light quantity. Furthermore, in the first embodiment, since RGB signals can be extracted even if many W pixels are arranged, this produces the effect of apparently increasing the number of RGB pixels.

Second Embodiment

Next, a CMOS image sensor according to a second embodiment of the invention will be explained. The same parts as those of the configuration of the first embodiment are indicated by the same reference numerals and an explanation of them will be omitted. The second embodiment is such that the dynamic range expending method is modified in the first embodiment.

Figure 6:
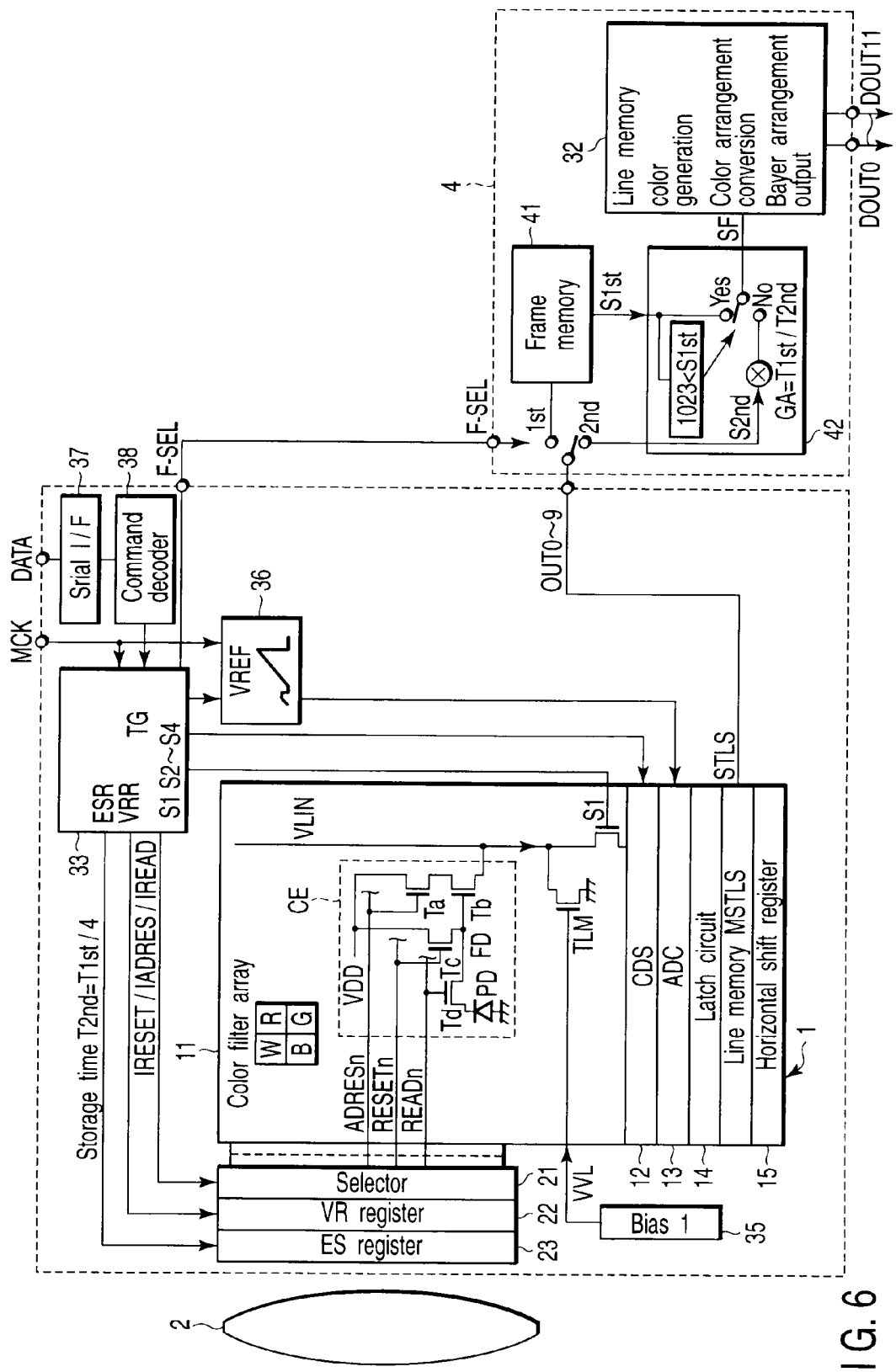
FIG. 6 is a block diagram schematically showing the configuration of a CMOS image sensor according to a second embodiment of the invention.

FIG. 6 is a block diagram schematically showing the configuration of the CMOS image sensor according to the second embodiment. The image sensor outputs the signal at twice the speed of the first embodiment (the image sensor may output at the same speed as that of the first embodiment). A PRE signal processing circuit 4, which includes a frame memory 41, combines two frames of data into one frame of signal. To obtain a small-light-quantity signal in a first frame, the storage time is made longer and signal S1st is output. The signal S1st is stored in the frame memory 41. In a second frame, the storage time is set to ¼ of the storage time of the first frame and signal S2nd is output from the sensor. At this time, the linear conversion circuit 42 of the PRE signal processing circuit 4 amplifies signal S2nd so that the gain of signal S2nd may be quadrupled. If signal S1st output from the frame memory 41 is saturated in 10 bits, signal S2nd is output as signal SF. Thereafter, as in the first embodiment, 12-bit data DOUT0 to DOUT11 are output via the signal generator circuit 32 to a signal processing IC (not shown) in a subsequent stage.

Figure 7A:
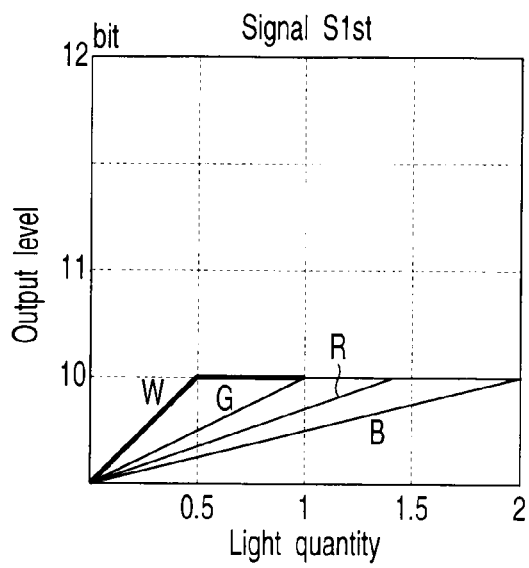
FIGS. 7A, 7B, and 7C are photoelectric conversion characteristic diagrams showing the operation of a linear conversion circuit 42 shown in FIG. 6.
Figure 7B:
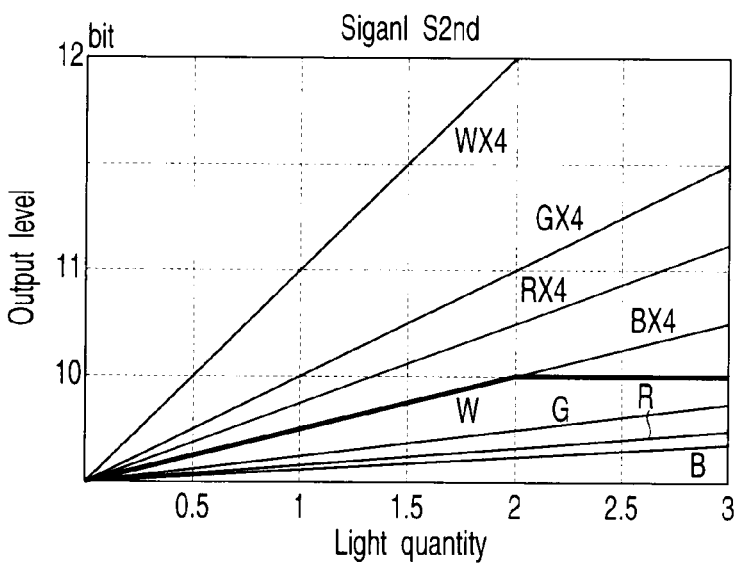
Figure 7C:
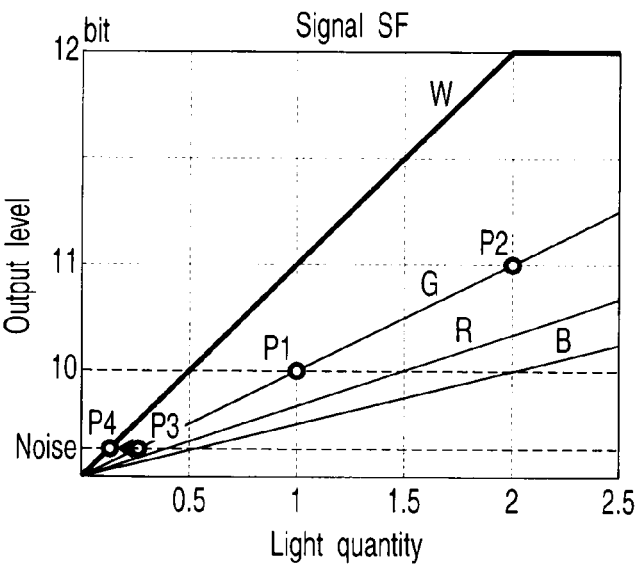

FIGS. 7A, 7B, and 7C are photoelectric conversion characteristic diagrams showing the operation of the linear conversion circuit 42 shown in FIG. 6. FIG. 7A shows signal S1st, FIG. 7B shows signal S2nd, and FIG. 7C shows signal SF. The abscissa axis indicates the quantity of light. The ordinate axis indicates the digital output level. In signal S1st shown in FIG. 7C, the G signal is saturated in 10 bits at a light quantity of 1. Since the W signal has twice the sensitivity of the G signal, it is saturated at a light quantity of 0.5. In signal S2nd shown in FIG. 7B, since the storage time is set to ¼, the W signal is saturated at a light quantity of 2. If the gain of the W signal is quadrupled, a 11-bit signal can be reproduced at a light quantity of 1.

In the combined signal SF shown in FIG. 7C, signal S1st is switched to the signal (W×4) obtained by quadrupling signal S2nd in gain at a 10-bit saturation level 1023LSB, which enables the W signal to be reproduced as a linear signal in up to 12 bits at a light quantity of 2. Shifting the standard light quantity from conventional point P1 to point 2 makes it possible to extend the dynamic range to twice that of a conventional one.

Furthermore, if the noise level, the lowest subject illuminance, is equal to the signal level, point P3 previously determined by the G signal can be shifted to point P4 determined by the W signal, which makes it possible to reduce the light quantity to ½. This improves the sensitivity of the pixel unit by doubling the sensitivity. Moreover, the storage time in the second frame is made still smaller to ⅛ or 1/16 of that of the first frame, which enables the dynamic range to be quadrupled or octupled.

Third Embodiment

A third embodiment of the invention is such that a signal processing circuit is incorporated into the CMOS image sensor of the first embodiment to form a one-chip sensor. The remaining configuration is the same as that of the first embodiment. The same parts as those of the configuration of the first embodiment are indicated by the same reference numerals and an explanation of them will be omitted.

Figure 8:
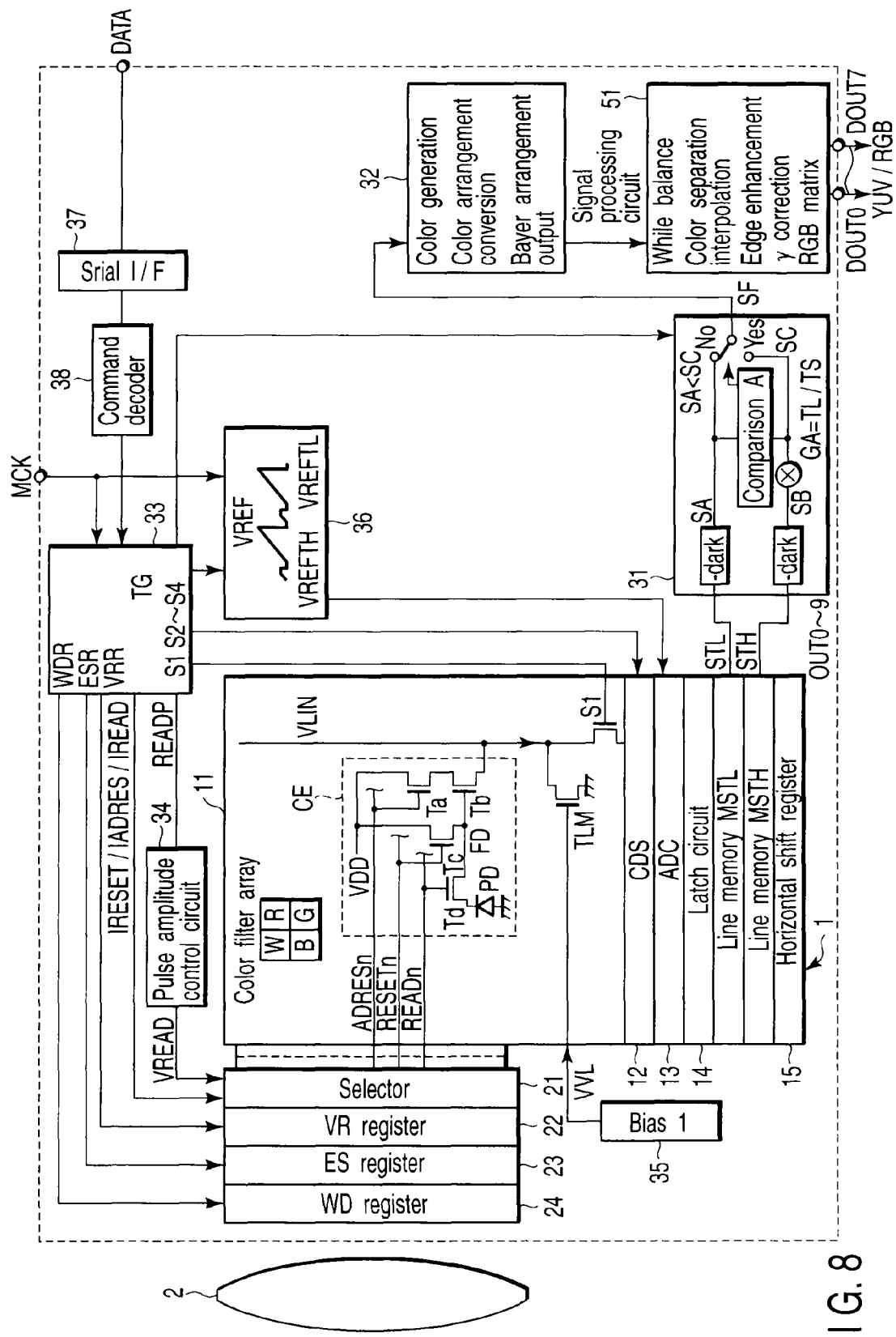
FIG. 8 is a block diagram schematically showing the configuration of a CMOS image sensor according to a third embodiment of the invention.

FIG. 8 is a block diagram schematically showing the configuration of the CMOS image sensor according to the third embodiment. A signal processing circuit 51 is added to the CMOS image sensor of FIG. 1, thereby producing a one-chip configuration. As shown in FIG. 8, the signal converted into an RGB Bayer arrangement at the signal generator circuit 32 is supplied to the signal processing circuit 51. The signal processing circuit 51 carries out normal processes, including a while balance process, a color separation interpolating process, an edge enhancement process, a Ycorrection process, and a color tuning process using an RGB matrix. As a result, RGB signals or YUV signals can be output as the outputs DOUT0 to DOUT7 of the CMOS image sensor.

Fourth Embodiment

A fourth embodiment of the invention is such that a signal processing circuit is added to the PRE signal processing circuit 4 of the second embodiment so as to produce a 2-chip configuration. The remaining configuration is the same as that of the second embodiment. The same parts as those of the configuration of the second embodiment are indicated by the same reference numerals and an explanation of them will be omitted.

FIG. 9 is a block diagram schematically showing the configuration of the CMOS image sensor according to the fourth embodiment. A signal processing circuit 51 is added to the PRE signal processing circuit 4 of the CMOS image sensor of FIG. 6. As shown in FIG. 9, the signal converted into an RGB Bayer arrangement at the signal generator circuit 32 is supplied to the signal processing circuit 51. The signal processing circuit 51 carries out normal processes, including a while balance process, a color separation interpolating process, an edge enhancement process, a Ycorrection process, and a color tuning process using an RGB matrix. As a result, RGB signals or YUV signals can be output as the outputs DOUT0 to DOUT7 of the CMOS image sensor.

Fifth Embodiment

Next, a color filter array and a signal generator circuit in a CMOS image sensor according to a fifth embodiment of the invention will be explained. The fifth embodiment is such that the color filter array is modified in the first embodiment. The remaining configuration is the same as that of the first embodiment.

Figure 10:
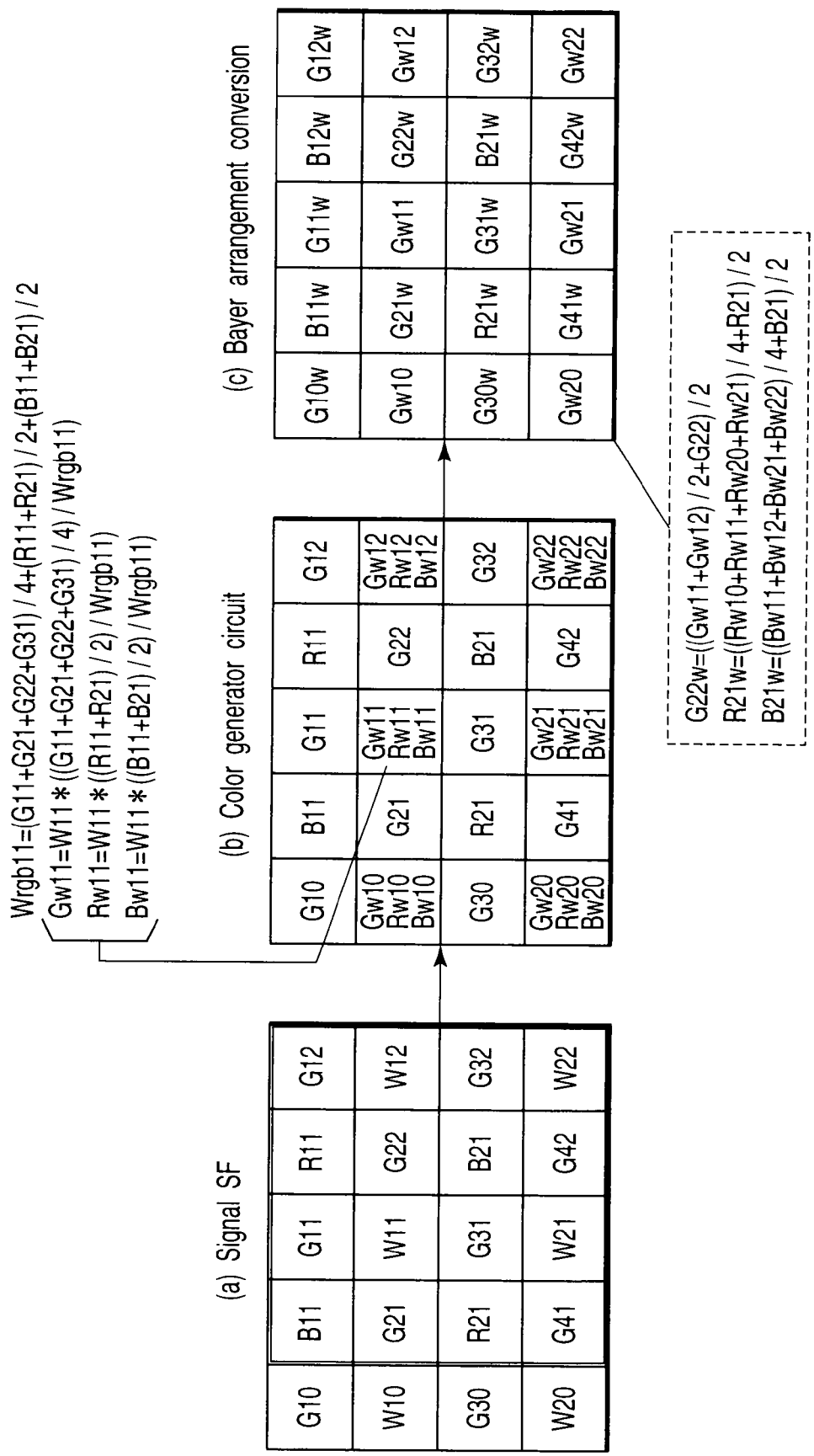
FIG. 10 shows a color filter array and an example of the processing at the signal generator circuit in a CMOS image sensor according to a fifth embodiment of the invention.

FIG. 10 shows a color filter array and an example of the processing at the signal generator circuit in the CMOS image sensor of the fifth embodiment. In the signal SF as shown by (a) in FIG. 10 input to the signal generator circuit 32, color filters are arranged using 4×4 pixels as a unit. As compared with an ordinary RGB Bayer arrangement, the R and B color signals which require less resolution information are reduced to ½ and the G signal is arranged above and below and on the right and left sides of each pixel. Four W pixels are arranged equally in the remaining positions. R pixels and B pixels are arranged diagonally at the four remaining pixels. A 4×4 basic array including 8 G pixels, 4 W pixels, 2 R pixels, and 2 B pixels is repeated.

Hereinafter, the process of generating RGB signals from the W signal at the color generator circuit will be described.

In the fifth embodiment, a ratio multiplying method is used for the processing at the color generator circuit as in FIG. 4. In FIG. 10, (b) shows a ratio multiplying method of calculating a W (white) signal level and RGB signal levels from 8 pixels around, for example, pixel W11, and generating Rw, Gw, and Bw signals from pixel W11 on the basis of the ratio of RGB to W:

$$Wrgb11 = \frac{G11 + G12 + G22 + G31}{4} + \frac{R11 + R21}{2} + \frac{B11 + B21}{2}$$

$$Gw11 = W11 * \left(\frac{(G11 + G21 + G22 + G31)/4}{Wrgb11}\right)$$

$$Rw11 = W11 * \left(\frac{(R11 + R21)/2}{Wrgb11}\right)$$

$$Bw11 = W11 * \left(\frac{(B11 + B21)/2}{Wrgb11}\right)$$

The experimental results have shown that the S/N of the Gw signal generated from W was improved by about 3 dB with respect to the G signal, the S/N of the Rw signal was improved by about 4.5 dB with respect to the R signal, and the S/N of the Bw signal was improved by about 4.5 dB with respect to the B signal as in the first embodiment.

In FIG. 10, (c) shows a pixel array subjected to the RGB Bayer arrangement conversion at the color arrangement conversion circuit. Gw11 color-generated is used directly as pixel W11. A method of processing each of GRB will be described using the processing of pixels G22, R12, and B21 as an example. To make the same improvement in the S/N as that of Gw11 and obtain the same resolution level as that of Gw11, information on the left and right pixels, Gw11, Gw12, are added. Furthermore, the S/N of pixel R21 is improved by adding information on Rw10, Rw11, Rw20, and Rw21 created from W of the four oblique pixels. Similarly, the S/N of pixel B21 is improved by adding information on Bw11, Bw12, Bw21, and Bw22 generated from W of the four oblique pixels.

The following calculations are done sequentially, thereby converting the data into a Bayer arrangement:

$$G22w = \frac{(Gw11 + Gw12)/2 + G22}{2}$$

$$R12w = \frac{(Rw10 + Rw11 + Rw20 + Rw21)/4 + R21}{2}$$

$$B21w = \frac{(Bw11 + Bw12 + Bw21 + Bw22)/4 + B21}{2}$$

In experiments, in the result of processing the luminance signal Y=0.59G+0.3R+0.11B of the YUV signal, the S/N of the luminance signal Y was improved by about 3 dB at an ordinary light quantity. Moreover, at the lowest subject illuminance, effective use of the W signal realized twice the sensitivity determined by a conventional G signal.

Sixth Embodiment

A sixth embodiment of the invention is such that the color filter array is modified in the first embodiment. The remaining configuration is the same as that of the first embodiment.

FIG. 11 shows a color filter array and an example of the processing at the signal generator circuit in the CMOS image sensor of the sixth embodiment. In the signal SF as shown by (a) in FIG. 11 input to the signal generator circuit 32, color filters are arranged using 4×4 pixels as a unit. As compared with an ordinary RGB Bayer arrangement, the R and B color signals which require less resolution information are reduced to ½ and the W signal is arranged above and below and on the right and left sides of each pixel. Four G pixels are arranged equally in the remaining positions. R pixels and B pixels are arranged diagonally at the four remaining pixels. A 4×4 basic array including 8 W pixels, 4 G pixels, 2 R pixels, and 2 B pixels is repeated.

Hereinafter, the process of generating RGB signals from the W signal at the color generator circuit will be described.

In the sixth embodiment, a ratio multiplying method is used for the processing at the color generator circuit as in FIG. 4. In FIG. 11, (b) shows a ratio multiplying method of calculating a W (white) signal level and RGB signal levels from 4 pixels around, for example, pixel W22, and generating Rw, Gw, and Bw signals from pixel W22 on the basis of the ratio of RGB to W:

$$Wrgb12 = \frac{G11 + G12}{2} + R11 + B21$$

$$Gw22 = W22 * \frac{(G11 + G12)/2}{Wrgb22}$$

$$Rw22 = W22 * \frac{R11}{Wrgb22}$$

$$Bw22 = W22 * \frac{B21}{Wrgb22}$$

With the sixth embodiment, increasing the number of pixels of the W signal makes it possible to improve the S/N and resolution at a low illuminance.

Seventh Embodiment

A seventh embodiment of the invention is such that the color filter array is modified in the first embodiment and four line memories are provided in the signal generator circuit 32, thereby improving the S/N by vertical five-line processing. The remaining configuration is the same as that of the first embodiment.

FIG. 12 shows a color filter array and an example of the processing at the signal generator circuit in the CMOS image sensor of the seventh embodiment. The color filter array is the same as that of FIG. 11 in the sixth embodiment.

Hereinafter, the process of generating RGB signals from the W signal at the color generator circuit will be described.

In the seventh embodiment, a ratio multiplying method is used for the processing at the color generator circuit as in FIG. 4. In FIG. 12, (b) shows an example of calculating a W (white) signal level and RGB signal levels from 7 horizontal pixels and 5 vertical lines, focusing on pixel W32, and generating Rw, Gw, and Bw signals from pixel W32 on the basis of the ratio of RGB to W:

$$Wrgb32 = \frac{G12 + G13 + G21 + G22 + G23 + G24 + G32 + G33}{8} + \frac{R11 + (R21/2) + (R22/2)}{2} + \frac{B21 + (B11/2) + (B12/2)}{2}$$

$$Gw32 = W32 * \frac{(G12 + G13 + G21 + G22 + G23 + G24 + G32 + G33)/8}{Wrgb32}$$

$$Rw32 = W32 * \frac{R11 + (R21/2) + (R22/2)}{2} * \frac{1}{Wrgb32}$$

$$Bw32 = W32 * \frac{B21 + (B11/2) + (B12/2)}{2} * \frac{1}{Wrgb32}$$

With the seventh embodiment, increasing the number of pixels of the W signal makes it possible to improve the S/N and resolution at a low illuminance. Moreover, since the G signals from 8 pixels arranged around the target pixel are used, the S/N can be improved more than in the sixth embodiment.

Eighth Embodiment

An eighth embodiment of the invention is such that the color filter array is modified in the first embodiment. The remaining configuration is the same as that of the first embodiment.

Figure 13:
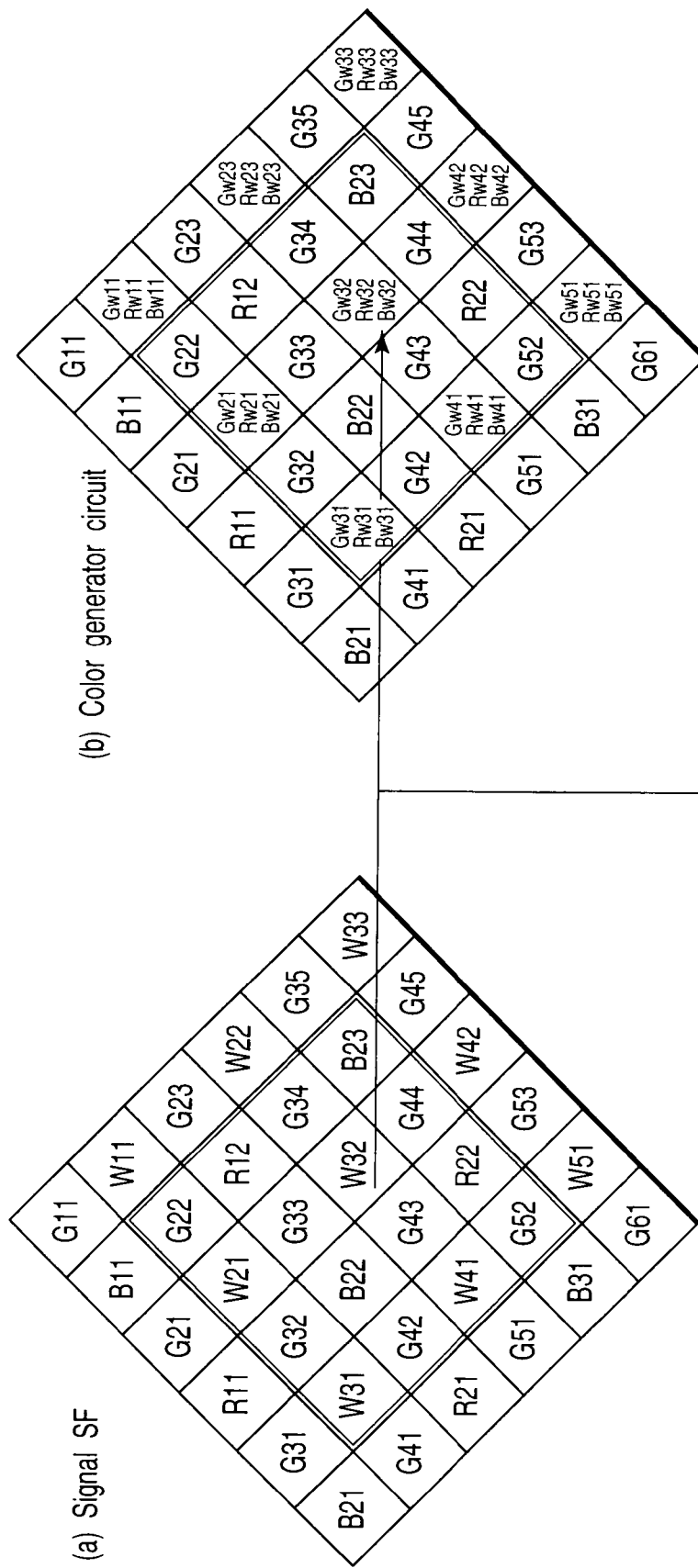
FIG. 13 shows a color filter array and an example of the processing at the signal generator circuit in a CMOS image sensor according to an eighth embodiment of the invention.

FIG. 13 shows a color filter array and an example of the processing at the signal generator circuit in the CMOS image sensor of the eighth embodiment. In the signal SF as shown by (a) in FIG. 13 input to the signal generator circuit 32, color filters are arranged using 4×4 pixels as a unit in such a manner that the square array of FIG. 10 is inclined at an angle of 45 degrees. As compared with an ordinary RGB Bayer arrangement, the R and B color signals which require less resolution information are reduced to ½ and the G signal is arranged above and below and on the right and left sides of each pixel. Four W pixels are arranged equally in the remaining positions. R pixels and B pixels are arranged diagonally at the four remaining pixels. A 4×4 basic array including 8 G pixels, 4 W pixels, 2 R pixels, and 2 B pixels is repeated.

Hereinafter, the process of generating RGB signals from the W signal at the color generator circuit will be described.

In the eighth embodiment, a ratio multiplying method is used for the processing at the color generator circuit as in FIG. 4. In FIG. 13, (b) shows an example of calculating a W (white) signal level and RGB signal levels from 8 pixels around, for example, pixel W32, and generating Rw, Gw, and Bw signals from pixel W32 on the basis of the ratio of RGB to W:

$$Wrgb32 = \frac{G33 + G34 + G43 + G44}{4} + \frac{R12 + R22}{2} + \frac{B22 + B23}{2}$$

$$Gw32 = W32 * \frac{(G33 + G34 + G43 + G44)/4}{Wrgb32}$$

$$Rw32 = W32 * \frac{(R12 + R22)/2}{Wrgb32}$$

$$Bw32 = W32 * \frac{(B22 + B23)/2}{Wrgb32}$$

The experimental results have shown that the S/N of the Gw signal generated from W was improved by about 3 dB with respect to the G signal, the S/N of the Rw signal was improved by about 4.5 dB with respect to the R signal, and the S/N of the Bw signal was improved by about 4.5 dB with respect to the B signal as in the first embodiment.

Ninth Embodiment

A ninth embodiment of the invention is such that the color filter array is modified in the first embodiment. The remaining configuration is the same as that of the first embodiment.

Figure 14:
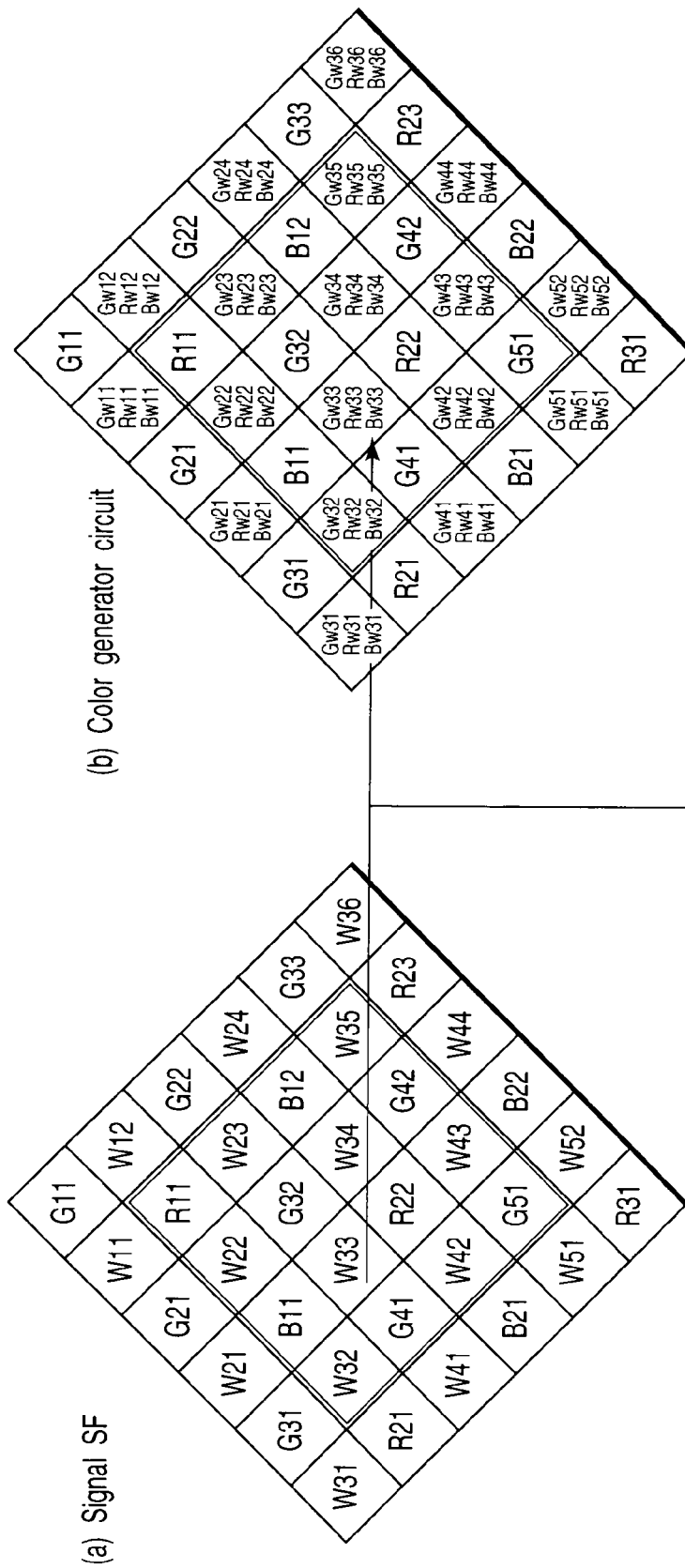
FIG. 14 shows a color filter array and an example of the processing at the signal generator circuit in a CMOS image sensor according to a ninth embodiment of the invention.

FIG. 14 shows a color filter array and an example of the processing at the signal generator circuit in the CMOS image sensor of the ninth embodiment. In the signal SF as shown by (a) in FIG. 14, the color filter array of FIG. 12 is inclined at an angle of 45 degrees using 4×4 pixels as a unit. As compared with an ordinary RGB Bayer arrangement, the R and B color signals which require less resolution information are reduced to ½ and the W signal is arranged above and below and on the right and left sides of each pixel. Four G pixels are arranged equally in the remaining positions. R pixels and B pixels are arranged diagonally at the four remaining pixels. A 4×4 basic array including 8 W pixels, 4 G pixels, 2 R pixels, and 2 B pixels is repeated.

Hereinafter, the process of generating RGB signals from the W signal at the color generator circuit will be described.

In the ninth embodiment, a ratio multiplying method is used for the processing at the color generator circuit as in FIG. 4. In FIG. 14, (b) shows an example of calculating a W (white) signal level and RGB signal levels from 4 pixels around, for example, pixel W33, and generating Rw, Gw, and Bw signals from pixel W33 on the basis of the ratio of RGB to W:

$$Wrgb33 = \frac{G32 + G41}{2} + R22 + B11$$

$$Gw33 = W33 * \frac{(G32 + G41)/2}{Wrgb33}$$

$$Rw33 = W33 * \frac{R22}{Wrgb33}$$

$$Bw33 = W33 * \frac{B11}{Wrgb33}$$

With the ninth embodiment, increasing the number of pixels of the W signal makes it possible to improve the S/N and resolution at a low illuminance.

Tenth Embodiment

A tenth embodiment of the invention is such that the color filter array is modified in the first embodiment. The remaining configuration is the same as that of the first embodiment.

Figure 15:
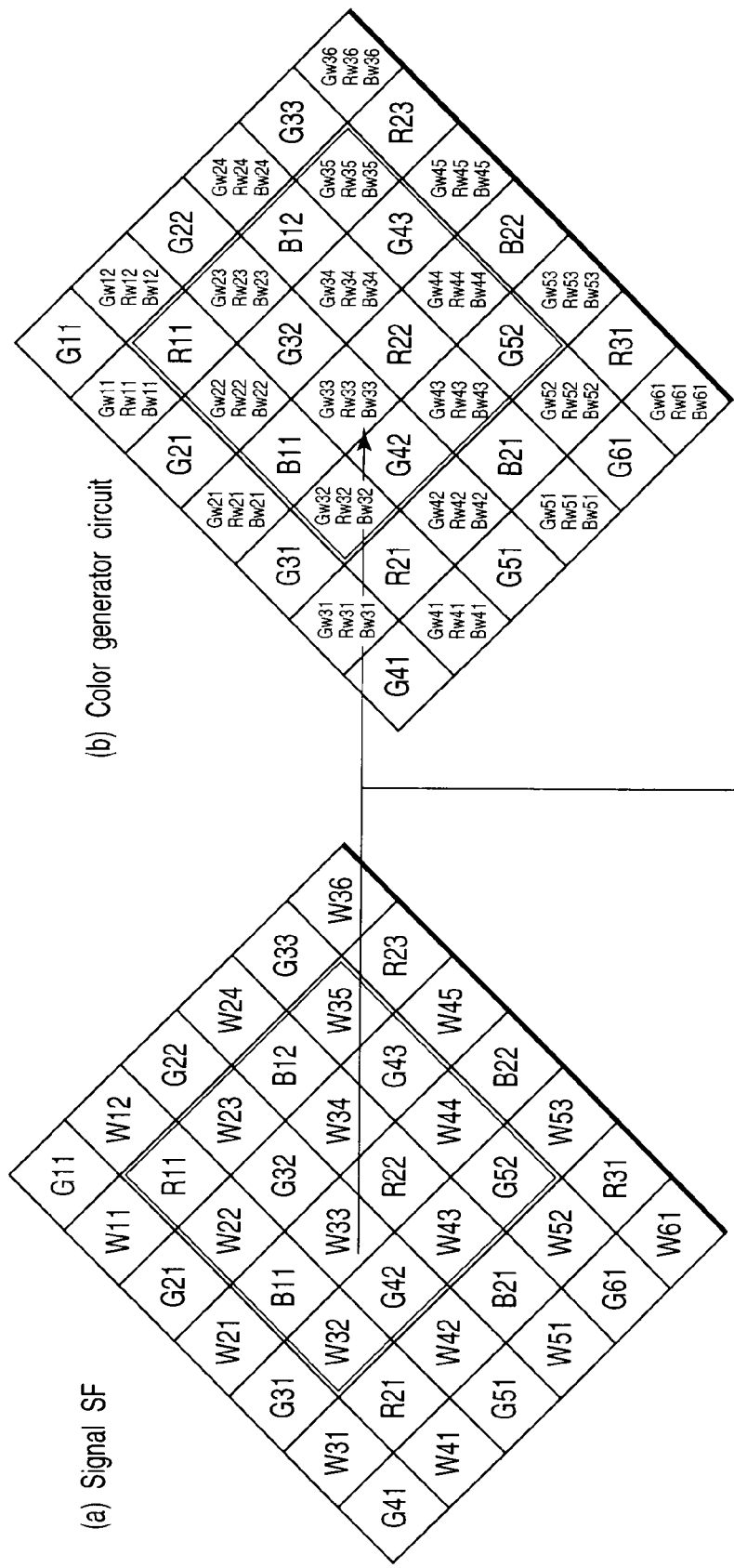
FIG. 15 shows a color filter array and an example of the processing at the signal generator circuit in a CMOS image sensor according to a tenth embodiment of the invention.

FIG. 15 shows a color filter array and an example of the processing at the signal generator circuit in the CMOS image sensor according to the tenth embodiment. The color filter array is the same as that of FIG. 14 in the ninth embodiment.

The process of generating RGB signals from the W signal at the color generator circuit is carried out using the ratio multiplying method as described below. In FIG. 15, (b) shows an example of generating Rw, Gw, and Bw signals from the signal of pixel W33:

$$Wrgb33 = \frac{G21 + G22 + G31 + G32 + G42 + G43 + G51 + G52}{8} + \frac{R22 + (R11/2) + (R21/2)}{2} + \frac{B11 + (B12/2) + (B21/2)}{2}$$

$$Gw33 = W33 * \frac{(G21 + G22 + G31 + G32 + G42 + G43 + G51 + G52)/8}{Wrgb33}$$

$$Rw33 = W33 * \frac{R22 + (R11/2) + (R21/2)}{2} * \frac{1}{Wrgb33}$$

$$Bw33 = W33 * \frac{B11 + (B12/2) + (B21/2)}{2} * \frac{1}{Wrgb33}$$

With the tenth embodiment, increasing the number of pixels of the W signal makes it possible to improve the S/N and resolution at a low illuminance. Moreover, since the G signals from 8 pixels arranged around the target pixel are used, the S/N can be improved more than in the ninth embodiment. The G signal used in the equations is illustrative and not restrictive. The G signal from another G pixel may be used.

Eleventh Embodiment

In an eleventh embodiment of the invention, the configuration of a CMOS image sensor corresponding to the color filter arrays shown in FIGS. 14 and 15 will be explained. The same parts as those of the configuration of the first embodiment are indicated by the same reference numerals and an explanation of them will be omitted.

Figure 16:
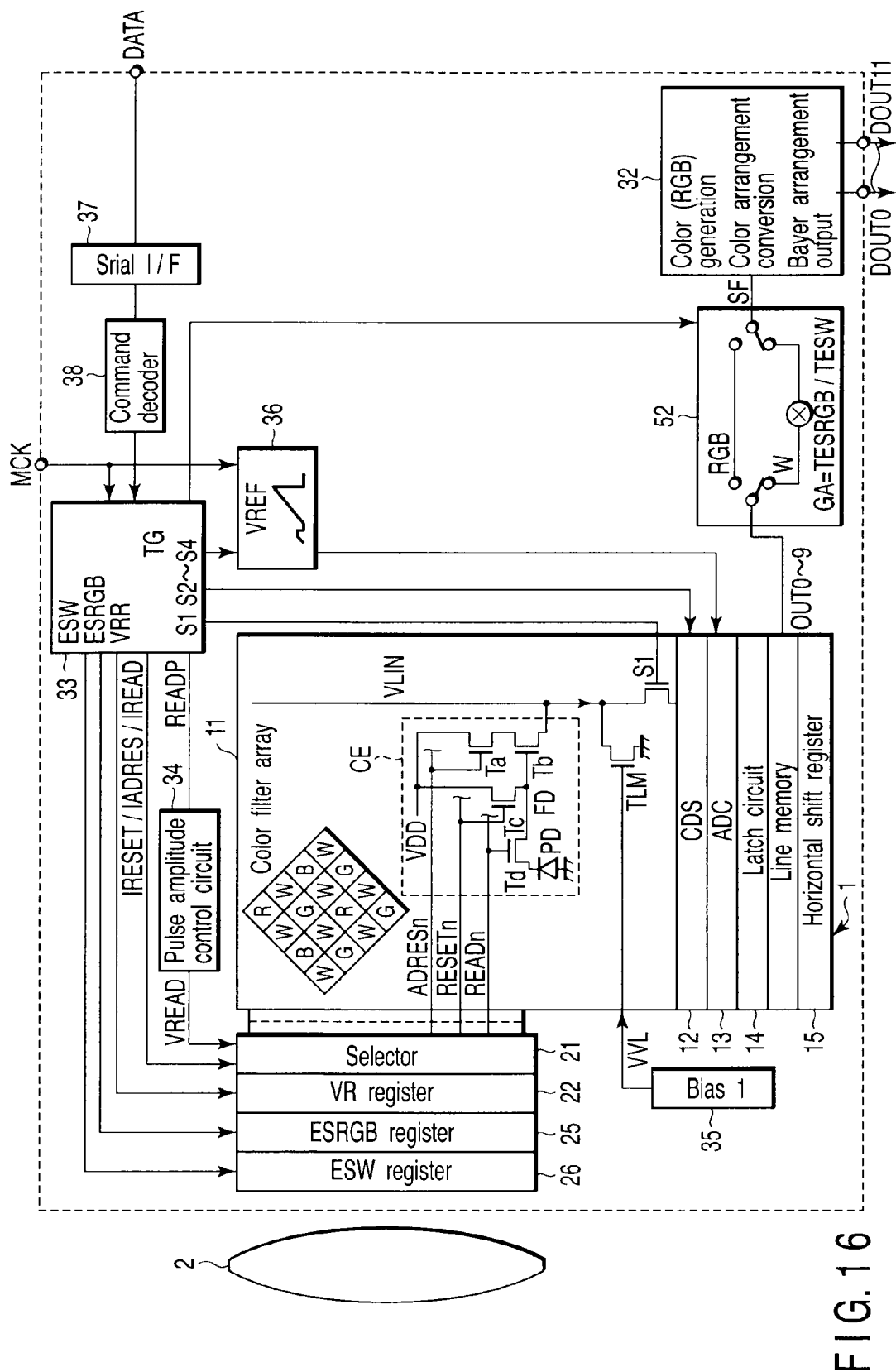
FIG. 16 is a block diagram schematically showing the configuration of a CMOS image sensor according to an eleventh embodiment of the invention.

FIG. 16 is a block diagram schematically showing the configuration of a CMOS image sensor according to the eleventh embodiment. Next to the pixel unit 11, there are provided a pulse selector circuit (selector) 21, a signal read vertical register (VR register) 22, a storage time control vertical register (ESRGB register) 25, and a storage time control vertical register (ESW register) 26. The ESRGB register 25 is a register which controls the storage time at an R pixel, a G pixel, or a B pixel. The ESW register 26 is a register which controls the storage time at a W pixel. Each row of color filters arranged in the pixel unit 11 is provided with a W line. Therefore, the storage time is controlled by a special electronic shutter so as to prevent the high-sensitivity W pixel from being saturated. Since the W signal has twice the sensitivity of the G signal, the storage time of the W signal is set to ½ of the storage time of the remaining RGB signals using the special electronic shutter. At a low light quantity, the lowest subject illuminance is improved to be ½ using twice the sensitivity of the G signal without applying the electronic shutter to the W pixel. In the linear conversion circuit 52, when the electronic shutter operates only on the W pixel, only the signal from the W pixel is amplified with the storage time ratio by the gain circuit GA, thereby switching to the original array to produce an SF signal.

Since the W pixel is not controlled by the electronic shutter at a low light quantity, the storage time of the W signal become equal to that of the RGB signals. For this reason, to prevent the signal from the W pixel from being amplified, the linear conversion circuit 52 switches to the RGB signal side to cause the W signal to pass through. The switching operation enables the signal generator circuit 32 in a subsequent stage to be used without modification even at a low light quantity.

Twelfth Embodiment

In the first, second, and eleventh embodiments, the dynamic range extended mode has been used to prevent the output from the W pixel from being saturated or only light incident on the W pixel has been controlled by the electronic shutter. If the two methods are not applied, the output from the W pixel will be saturated at a light quantity of 0.5 or more in a standard image sensor as shown in FIG. 7A. As a measure against this, an example of generating a W signal by making an estimate from pixels around the W pixel will be shown in a twelfth embodiment of the invention.

Explanation will be given using the color filter array shown by (a) in FIG. 4. When pixel W11 has been saturated, a W signal of a saturated signal level or more can be newly generated from the following equation:

$$W11 = kg * \frac{G11 + G12 + G21 + G22}{4} + kr * \frac{R11 + R12}{2} + kb * \frac{B11 + B21}{2}$$

This enables a measure against a saturated signal of the W pixel to be taken. That is, even when the W signal has been saturated, a W signal of the saturated signal level or more can be obtained and used. In the equation, kg, kr, and kb indicate white balance coefficients. The remaining configuration and effects are the same as those of the above embodiments.

Thirteenth Embodiment

Next, a color filter array in a CMOS image sensor according to a thirteenth embodiment of the invention will be explained. The thirteenth embodiment is such that the color filter array is modified in the first embodiment. The remaining configuration is the same as that of the first embodiment.

FIG. 17 shows a color filter array in the CMOS image sensor of the thirteenth embodiment. The color filter array is such that 10 W pixels, 2 G pixels, 2 R pixels, and 2 B pixels are provided in a 4×4 basic array. FIG. 18 shows another color filter array. The color filter array is such that 12 W pixels, 2 G pixels, an R pixel, and a B pixel are provided in a 4×4 basic array.

In the color filter arrays shown in FIGS. 17 and 18, since use of the ratio multiplying method with less RGB color information enables RGB signals to be generated from each W pixel, the number of G pixels, the number of R pixels, and the number of B pixels are virtually increased by 14, 13, and 13, respectively. Accordingly, since the color resolution is high, the number of false signals is small. Moreover, since the color signal requires less information amount, the S/N can be improved by an adding process. As compared with the Bayer arrangement, an increase in the number of G, R, and B pixels improves the G signal by about 2 dB, the R signal by about 5 dB, and the B signal by about 5 dB.

Increasing the number of surrounding pixels enables the ratio coefficient to improve the S/N more.

While in the above embodiments, the signal generator circuit 32 has generated RGB signals from the W signal of the W pixel and converted the RGB signals into the RGB Bayer arrangement, and the signal processing circuit 51 has performed conventional signal processing as shown in FIGS. 8 and 9, the signal generator circuit 32 may be eliminated and the signal SF may be input directly to the signal processing circuit 51, thereby performing signal processing suitable for WRGB pixels. A wide variety of color filter arrays can be considered and the aforementioned embodiments can be applied to them, provided that the four colors of WRGB are basically included.

Furthermore, by adding a transistor and a capacitance to a pixel cell (CE) and storing the signal charge overflowing the photodiode (PD) into the added capacitance, a W pixel saturated signal quantity control circuit can be applied to the dynamic range extending method for increasing the saturated signal quantity. Moreover, by using a direct current to control the gate voltage of the read transistor of the photodiode (PD) in the pixel cell (CE), the W pixel saturated signal quantity control circuit can be applied to the method for increasing the saturated signal quantity. In addition, the W pixel saturated signal quantity control circuit can be applied to other various dynamic extending methods.

With the invention, it is possible to provide an solid-state image pickup device capable of preventing a W signal obtained from W (white) pixels from being saturated and improving the sensitivity and S/N by a signal process using the W signal.

Furthermore, the above embodiments may be not only practiced independently but also combined suitably. Moreover, the embodiments include inventions of different stages and therefore various inventions can be extracted by combining suitably a plurality of component elements disclosed in the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A solid-state image pickup device comprising:
a pixel unit in which cells are arranged in rows and columns two-dimensionally on a semiconductor substrate, each of the cells having photoelectric conversion section, accumulating signal charge obtained by photoelectrically converting light incident on the photoelectric conversion section, and outputting a voltage corresponding to the accumulated signal charge;

W (white), R (red), G (green), and B (blue) color filters provided on the cells in the pixel unit;

an analog/digital converter circuit which converts analog signals output from a W pixel, an R pixel, a G pixel, and a B pixel on whose cells the W (white), R (red), G (green), and B (blue) color filters are provided respectively into digital signals, and outputs a W signal, an R signal, a G signal, and a B signal separately;

a saturated signal quantity control circuit which controls the saturated signal quantity of the W pixel, the saturated signal quantity control circuit including a storage time control circuit which accumulates signal charge in such a manner that the storage time during which signal charge is stored in the photoelectric conversion section is caused to differ;

a linear conversion circuit which processes signals in such a manner that the signals differing in the storage time have the same storage time spuriously; and a signal generator circuit which corrects and generates the R signal, the G signal, and the B signal using the W signal, the R signal, the G signal, and B signal output from the analog/digital converter circuit.

2. The solid-state image pickup device according to claim 1, wherein the saturated signal quantity control circuit includes an electronic shutter for W pixel only which independently controls only the storage time of signal charge in the W pixel.

3. The solid-state image pickup device according to claim 1, further comprising a noise cancel circuit which is provided in front of the analog/digital converter circuit and cancels noise in the analog signal.

4. The solid-state image pickup device according to claim 1, wherein the W (white), R (red), G (green), and B (blue) color filters include a 2-row, 2-column array, with the R (red) and B (blue) color filters arranged on one diagonal and the W (white) and G (green) color filters arranged on the other diagonal.

5. The solid-state image pickup device according to claim 1, wherein the W (white), R (red), G (green), and B (blue) color filters include a 4-row, 4-column array, with the G (green) color filters arranged every other pixel in the row and column directions, the W (white) color filters arranged equally at four of the remaining pixels, and each of the R (red) and B (blue) color filters arranged at the still remaining pixels diagonally.

6. The solid-state image pickup device according to claim 5, wherein the 4-row, 4-column array is inclined at an angle of 45 degrees.

7. The solid-state image pickup device according to claim 1, wherein the W (white), R (red), G (green), and B (blue) color filters include a 4-row, 4-column array, with the W (white) color filters arranged every other pixel in the row and column directions, the G (green) color filters arranged equally at four of the remaining pixels, and each of the R (red) and B (blue) color filters arranged at the still remaining pixels diagonally.

8. The solid-state image pickup device according to claim 7, wherein the 4-row, 4-column array is inclined at an angle of 45 degrees.

9. A solid-state image pickup device comprising:

a pixel unit in which cells are arranged in rows and columns two-dimensionally on a semiconductor substrate, each of the cells having photoelectric conversion section, accumulating signal charge obtained by photoelectrically converting light incident on the photoelectric conversion section, and outputting a voltage corresponding to the accumulated signal charge;

W (white), R (red), G (green), and B (blue) color filters provided on the cells in the pixel unit;

an analog/digital converter circuit which converts analog signals output from a W pixel, an R pixel, a G pixel, and a B pixel on whose cells the W (white), R (red), G (green), and B (blue) color filters are provided respectively into digital signals, and outputs a W signal, an R signal, a G signal, and a B signal separately;

a saturated signal quantity control circuit which controls the saturated signal quantity of the W pixel; and a signal generator circuit which corrects and generates the R signal, the G signal, and the B signal using the W signal, the R signal, the G signal, and B signal output from the analog/digital converter circuit, the signal generator circuit including ratio multiplying section which calculates a W signal by adding an R signal, a G signal, and a B signal obtained from an R pixel, a G pixel, and a B pixel around the W pixel and multiplies the W signal of the W pixel by the ratio of the R signal to the W signal, the ratio of the G signal to the W signal, and the ratio of the B signal to the W signal, thereby generating an R signal, a G signal, and a B signal.

10. The solid-state image pickup device according to claim 9, wherein the saturated signal quantity control circuit includes an electronic shutter for W pixel only which independently controls only the storage time of signal charge in the W pixel.

11. The solid-state image pickup device according to claim 9, further comprising a color arrangement conversion circuit which makes a conversion into a 2-row, 2-column Bayer arrangement including two G signals by performing an arithmetic operation on the R signal, G signal, and B signal generated from the W signal by the ratio multiplying section and the R signal, G signal, and B signal output from the analog/digital converter circuit.

12. The solid-state image pickup device according to claim 9, further comprising a noise cancel circuit which is provided in front of the analog/digital converter circuit and cancels noise in the analog signal.

13. The solid-state image pickup device according to claim 9, wherein the W (white), R (red), G (green), and B (blue) color filters include a 2-row, 2-column array, with the R (red) and B (blue) color filters arranged on one diagonal and the W (white) and G (green) color filters arranged on the other diagonal.

14. The solid-state image pickup device according to claim 9, wherein the W (white), R (red), G (green), and B (blue) color filters include a 4-row, 4-column array, with the G (green) color filters arranged every other pixel in the row and column directions, the W (white) color filters arranged equally at four of the remaining pixels, and each of the R (red) and B (blue) color filters arranged at the still remaining pixels diagonally.

15. The solid-state image pickup device according to claim 14, wherein the 4-row, 4-column array is inclined at an angle of 45 degrees.

16. The solid-state image pickup device according to claim 9, wherein the W (white), R (red), G (green), and B (blue) color filters include a 4-row, 4-column array, with the W (white) color filters arranged every other pixel in the row and column directions, the G (green) color filters arranged equally at four of the remaining pixels, and each of the R (red) and B (blue) color filters arranged at the still remaining pixels diagonally.

17. The solid-state image pickup device according to claim 16, wherein the 4-row, 4-column array is inclined at an angle of 45 degrees.

18. A solid-state image pickup device comprising:
- a pixel unit in which cells are arranged in rows and columns two-dimensionally on a semiconductor substrate, each of the cells having photoelectric conversion section, accumulating signal charge obtained by photoelectrically converting light incident on the photoelectric conversion section, and outputting a voltage corresponding to the accumulated signal charge;
- W (white), R (red), G (green), and B (blue) color filters provided on the cells in the pixel unit, the W (white), R (red), G (green), and B (blue) color filters including a 4-row, 4-column array, with ten W (white), two G (green), two R (red), and two B (blue) color filters being arranged;
- an analog/digital converter circuit which converts analog signals output from a W pixel, an R pixel, a G pixel, and a B pixel on whose cells the W (white), R (red), G (green), and B (blue) color filters are provided respectively into digital signals, and outputs a W signal, an R signal, a G signal, and a B signal separately;
- a saturated signal quantity control circuit which controls the saturated signal quantity of the W pixel; and
- a signal generator circuit which corrects and generates the R signal, the G signal, and the B signal using the W signal, the R signal, the G signal, and B signal output from the analog/digital converter circuit.

19. The solid-state image pickup device according to claim 18, wherein the saturated signal quantity control circuit includes an electronic shutter for W pixel only which independently controls only the storage time of signal charge in the W pixel.

20. The solid-state image pickup device according to claim 18, further comprising a noise cancel circuit which is provided in front of the analog/digital converter circuit and cancels noise in the analog signal.

* * * * *